US011067538B2

(12) United States Patent
Schneider et al.

(10) Patent No.: US 11,067,538 B2
(45) Date of Patent: Jul. 20, 2021

(54) SYSTEMS AND METHODS FOR EFFECTIVE GAP FILTERING AND ATMOSPHERIC PRESSURE RF HEATING OF IONS

(71) Applicant: DH TECHNOLOGIES DEVELOPMENT PTE. LTD., Singapore (SG)

(72) Inventors: Bradley B. Schneider, Bradford (CA); Erkinjon Nazarov, Tampa, FL (US); Thomas R. Covey, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 16/088,103

(22) PCT Filed: Mar. 21, 2017

(86) PCT No.: PCT/IB2017/051613
§ 371 (c)(1),
(2) Date: Sep. 25, 2018

(87) PCT Pub. No.: WO2017/168282
PCT Pub. Date: Oct. 5, 2017

(65) Prior Publication Data
US 2019/0113478 A1    Apr. 18, 2019

Related U.S. Application Data

(60) Provisional application No. 62/317,538, filed on Apr. 2, 2016.

(51) Int. Cl.
*G01N 27/624* (2021.01)
*H01J 49/00* (2006.01)
*H01J 49/16* (2006.01)

(52) U.S. Cl.
CPC ........ *G01N 27/624* (2013.01); *H01J 49/0045* (2013.01); *H01J 49/168* (2013.01)

(58) Field of Classification Search
None
See application file for complete search history.

(56) References Cited

U.S. PATENT DOCUMENTS

2003/0146377 A1 * 8/2003 Miller ............... G01N 27/624
250/286
2008/0210861 A1    9/2008 Wu et al.
(Continued)

FOREIGN PATENT DOCUMENTS

EP    1222680 A2    7/2002

OTHER PUBLICATIONS

International Search Report and Written Opinion for PCT/IB2017/051613, dated Jun. 12, 2017.
(Continued)

*Primary Examiner* — Andrew Smyth
(74) *Attorney, Agent, or Firm* — John R. Kasha; Kelly L. Kasha; Kasha Law LLC

(57) ABSTRACT

An apparatus includes a first electrode and a second electrode. The second electrode is placed in parallel with the first electrode to provide constant gap distance. The gap between the first electrode and the second electrode is at atmospheric pressure. Ions are introduced into the center of the gap and travel through the apparatus in a direction parallel to the first electrode and the second electrode. The apparatus is configured as a high-field symmetric-waveform apparatus for filtering high mobility ions or for fragmenting ions. The apparatus is also configured for three modes of operation: as a conventional DMS; as a filter high mobility ions; and as fragmentation device. A symmetric electric field is produced in the gap with a maximum density normalized field strength (Continued)

greater than 10 Td to filter high mobility ions and with a maximum density normalized field strength greater than 100 Td to fragment ions.

15 Claims, 23 Drawing Sheets

(56) References Cited

U.S. PATENT DOCUMENTS

| | | | |
|---|---|---|---|
| 2011/0101214 A1* | 5/2011 | Miller | G01N 27/624 |
| | | | 250/282 |
| 2012/0018631 A1* | 1/2012 | Giles | G01N 27/624 |
| | | | 250/282 |
| 2012/0298860 A1 | 11/2012 | Park et al. | |
| 2013/0284911 A1 | 10/2013 | Turner | |
| 2013/0306858 A1* | 11/2013 | Giles | H01J 49/36 |
| | | | 250/283 |
| 2015/0362461 A1 | 12/2015 | Prasad et al. | |

OTHER PUBLICATIONS

Marlen R. Menlyadiev et al. "Low-Mobility-Pass Filter between Atmospheric Pressure Chemical ionization and Electrospray Ionization Sources and a Single Quadrupole Mass Spectrometer: Computational Models and Measurements", Rapid Communications in Mass Spectrometry, vol. 28, No. 1, Nov. 28, 2013, pp. 135-142, XP055344061, GB.

* cited by examiner

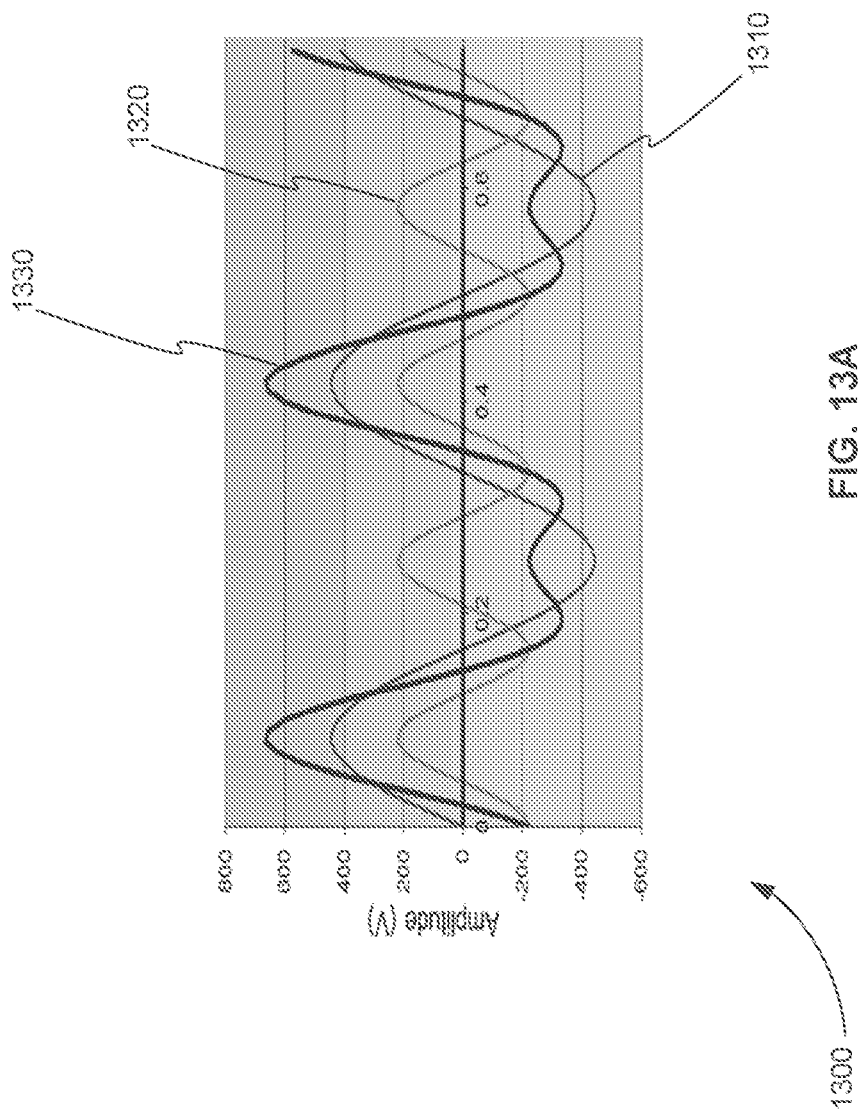

SYSTEMS AND METHODS FOR EFFECTIVE GAP FILTERING AND ATMOSPHERIC PRESSURE RF HEATING OF IONS

CROSS REFERENCE TO RELATED APPLICATION

This application claims the benefit of U.S. Provisional Patent Application Ser. No. 62/317,538, filed Apr. 2, 2016, the content of which is incorporated by reference herein in its entirety.

INTRODUCTION

The teachings herein relate to high-field asymmetric waveform ion mobility spectrometry (FAIMS) or differential mobility spectrometry (DMS). More particularly the teachings herein relate to systems and methods for operating a FAIMS or DMS device with a high-field symmetric waveform to remove contaminate ions from a mass spectrometry system at atmospheric pressure.

BACKGROUND

Instrumental contamination that can impact the performance of a mass spectrometer is of increasing concern. One type of contamination includes high mobility ions with low mass-to-charge ratio (m/z) values. Menlyadiev et al., "Low-mobility-pass filter between atmospheric pressure chemical ionization and electrospray ionization sources and a single quadrupole mass spectrometer: computational models and measurements," Rapid Commun. Mass Spectrom., 2014, 28, 135-142, describe this type of contamination. They suggest that these high mobility contaminant ions are produced through electrospray ionization (ESI) or matrix-assisted laser desorption/ionization (MALDI) of solvents or matrices of samples. They say that these solvent or matrix-derived ions are at high abundance principally with (m/z) values below 250. They describe that these contaminants may increase the complexity of spectral interpretations or affect the sensitivity from space charge effects in ion-trap mass spectrometry. They provide that these contaminants can be considered as chemical noise and degrade signal-to-noise (S/N) ratios, particularly for ions between 50 and 300 m/z.

Another type of contamination includes very low mobility ions with very high mass-to-charge ratio (m/z) values. These contaminants are sometimes referring to as asteroids, large clusters, or charged particles with m/z values that are normally undetectable by mass spectrometers. These contaminants have m/z values above 1,000, for example. Although these contaminants are not detected by a mass spectrometer, they can still contaminate the downstream vacuum ion optics of the mass spectrometer. In addition, these high m/z contaminants may be fragmented in the interface or collision cell of a mass spectrometer, producing lower m/z fragments, so it is important to eliminate them prior to the inlet.

Menlyadiev et al. describe that high mobility contaminants can be excluded using electric field-based ion filters placed between a source (often at ambient pressure) and a vacuum interface: a capillary tube, pinhole, or skimmer cone. They separate these electric field-based ion filters into two types.

The first type is a high electric field device. Menlyadiev et al. provide that conventional high electric field FAIMS or DMS devices have been used to select or filter analyte ions over low mass chemical noise. They say that 50-fold increases in S/N, 10-fold increases in detection limits, and 5-fold increases in dynamic range have been reported with FAIMS devices. However, they describe that the successful application of these devices depends on user knowledge of analyte mobility, the influences of parameters on differential mobility, and the implementation of high frequencies and high voltages.

The second type of electric field-based ion filter described by Menlyadiev et al. is a low electric field device. One military-derived ion filter they described passed ions through a wire grid with electric fields perpendicular to the ion and gas flow. They described that high mobility ions were selectively drawn to the wires and neutralized by collisions with the wires, while low mobility ions passed through the wire grid. They called such a filter a low-mobility-pass filter (LMPF).

Menlyadiev et al. also proposed their own planar LMPF. Their planar LMPF consisted of two rectangular gold-plated copper plates separated by a Teflon gasket with a channel for gas flow between the plates. A low-frequency, low-amplitude symmetric waveform was applied to one plate while the other was grounded. The applied symmetric waveform caused high mobility ions to collide and be discharged by the plates, while low mobility ions did not reach the plates and passed through the filter.

Menlyadiev et al. found that their low-frequency and low-voltage planar LMPF produced mass spectra where high mobility contaminant ions could be removed with an efficiency near 100%. However, the relatively broad response function of the low-frequency and low-voltage planar LMPF suggested that it could not match the S/N ratios of high-frequency and high-voltage FAIMS or DMS devices. In addition, the low-frequency and low-voltage planar LMPF was directed only to the removal of high mobility contaminant ions. As a result, it could not be used to filter other contaminants, such as very low mobility asteroids.

Consequently, systems and methods are needed to filter or remove contaminant ions at S/N ratios approaching high-frequency and high-voltage FAIMS or DMS devices and to filter contaminant ions with lower mobilities and higher m/z values.

SUMMARY

Various embodiments described herein (LMPF, FAIMS, or DMS) include an apparatus with a first electrode and a second electrode. The second electrode is placed in parallel with the first electrode to provide constant gap distance between the first electrode and the second electrode. The gap between the first electrode and the second electrode is at atmospheric pressure, for example. Alternatively, the DMS region may be pumped to below atmospheric pressure to increase the E/N ratio for more effective ion fragmentation and/or effective gap filtering. Targeted ion species are introduced into the center of the gap and travel through the apparatus in a direction parallel to the first electrode and the second electrode.

Various embodiments include configuring the apparatus as a high-field symmetric-waveform apparatus for filtering high mobility ions. A first high-voltage waveform generator is electrically connected to the first electrode. The first waveform generator is configured to produce a first symmetric waveform. The first symmetric waveform produces a symmetric electric field waveform in the gap with a maximum electric field strength greater than 2,500 V/cm or greater than 10 Td. This high electric field strength makes the mobility coefficient of ions in the gap a function of the electric field. The constant gap distance and the amplitude and frequency of the first symmetric waveform are configured to filter high mobility ions by producing the electric field waveform with an amplitude and frequency that causes ions in the gap with a mobility coefficient greater than or equal to a certain value to impact the first electrode or the second electrode and be removed, and causes ions in the gap with a mobility coefficient less than that value to pass through the gap or to be transmitted.

In various embodiments, a second high-voltage waveform generator is electrically connected to the second electrode to produce a second symmetric waveform. The first waveform and the second waveform are then used to produce the symmetric electric field waveform in the gap. The amplitude and frequency of the first symmetric waveform and the amplitude and frequency of the second symmetric waveform are then configured to filter high mobility ions in the gap.

Various embodiments include a method for configuring the apparatus as a high-field symmetric-waveform apparatus for filtering high mobility ions. A first symmetric waveform is applied to the first electrode to produce a symmetric electric field waveform in the gap between the first electrode and the second electrode with a maximum electric field strength greater than 2,500 V/cm. As described above, the constant gap distance and the amplitude and frequency of the first symmetric waveform are configured to filter high mobility ions.

In various embodiments, the method includes applying a second symmetric waveform to the second electrode. As described above, the first waveform and the second waveform are then used to produce the symmetric electric field waveform in the gap. In some embodiments, the second symmetric waveform may be a harmonic of the first symmetric waveform and the phase difference may be adjusted to provide either a symmetric or an asymmetric waveform in the gap. In other embodiments, the frequency and/or amplitude of at least one of the sinusoidal waveforms may be adjusted to provide either a symmetric or an asymmetric waveform in the gap.

Various embodiments include configuring the apparatus as a high-field symmetric-waveform apparatus for fragmenting ions. Again, a first high-voltage waveform generator is electrically connected to the first electrode. The first waveform generator is configured to produce a first symmetric waveform. Now, however, the first symmetric waveform produces a symmetric electric field waveform in the gap with a maximum electric field strength greater than 25,000 V/cm or greater than E/N~100 Td when pressure in the gap is ambient. It will be apparent to those of skill in the relevant arts that the gas density between the electrodes may be adjusted by decreasing or increasing the pressure from atmospheric, and this approach can be used to adjust the E/N ratio higher (by decreasing the pressure) or lower (by increasing the pressure). Specifically, the amplitude of the first symmetric waveform is configured to produce the electric field waveform in the gap with a maximum density normalized electric field strength greater than 100 Td to fragment ions in the gap. In addition, the amplitude and frequency of the first symmetric waveform are configured to transmit all ions in the gap rather than to mobility filter the ions.

In various embodiments, a second high-voltage waveform generator is electrically connected to the second electrode to produce a second symmetric waveform. The first waveform and the second waveform are then used to produce the symmetric electric field waveform in the gap. The amplitude and frequency of the first symmetric waveform and the amplitude and frequency of the second symmetric waveform are then configured to fragment and transmit ions in the gap.

Various embodiments include a method for configuring the apparatus as a high-field symmetric-waveform apparatus for fragmenting ions. A first symmetric waveform is applied to the first electrode to produce a symmetric electric field waveform in the gap between the first electrode and the second electrode with a maximum density normalized electric field strength greater than 100 Td. As described above, the amplitude and frequency of the first symmetric waveform are configured to fragment and transmit ions.

In various embodiments, the method includes applying different waveforms for filtering ions, by adding a second symmetric waveform to the second electrode. As described above, the first waveform and the second waveform are then used to produce the symmetric (or even asymmetric) electric field waveform with enhanced strength of electric field (E/N) in the gap.

Various embodiments include configuring the apparatus for three modes of operation. The first mode is as a conventional high-field asymmetric-waveform spectrometer (FAIMS) or differential mobility spectrometer (DMS). The second mode is as a high-field symmetric-waveform apparatus for filtering high mobility ions. The third mode is as a high-field symmetric-waveform apparatus for fragmenting ions.

Various embodiments include configuring the apparatus so that it is switchable between a high-field asymmetric-waveform apparatus for differential ion mobility spectrometry and a high-field symmetric-waveform apparatus for filtering high mobility ions. The apparatus further includes a first high-voltage waveform generator, a second high-voltage waveform generator, a phase adjusting circuit, and a switching circuit. The first waveform generator is configured to produce a first symmetric waveform, and the second waveform generator is configured to produce a second symmetric waveform. The phase adjusting circuit is configured to adjust the phase of one or both of the waveform generators.

For differential ion mobility spectrometry, the switching circuit electrically connects the first waveform generator to first electrode and electrically connects the second waveform generator to the second electrode. An electric field waveform created in the gap between, resulting from the application of the first waveform and second waveform, is asymmetric and has a time-averaged value substantially equal to zero.

For high-field symmetric-waveform filtering of high mobility ions, the switching circuit electrically connects the first waveform generator to the first electrode and electrically disconnects the second waveform generator from the second electrode. The first waveform produces a symmetric electric field waveform in the gap with a maximum density normalized electric field strength greater than 10 Td. As described above, the constant gap distance and the amplitude and frequency of the first symmetric waveform are configured to filter high mobility ions.

In various embodiments, for high-field symmetric-waveform filtering of high mobility ions, the switching circuit does not electrically disconnect the second waveform generator from the second electrode. Instead, phase adjusting circuit adjusts the phase difference of the waveforms to achieve a symmetric waveform in the gap. For instance, a FAIMS waveform can be constructed using a first sinusoidal with frequency (f) and amplitude (2a), and a second sinusoidal with frequency (2f) and amplitude (a). If the phase difference were adjusted to 0°, an asymmetric waveform suitable for FAIMS separation would be created. A controller could then adjust the phase difference of waveform 2 to approximately 90° to create a symmetrical waveform. The first waveform and the second waveform are then used to produce the symmetric electric field waveform in the gap. The amplitude and frequency of the first symmetric waveform and the amplitude and frequency of the second symmetric waveform are then configured to filter ions in the gap.

Various embodiments include a method for configuring the apparatus so that it is switchable between a high-field asymmetric-waveform apparatus for differential ion mobility spectrometry and a high-field symmetric-waveform apparatus for filtering high mobility ions. For differential ion mobility spectrometry, a first sinusoidal is applied to the first electrode and a second symmetric waveform is applied to the second electrode. A ratio of the amplitude of the first waveform to the amplitude of the second waveform and a relative phase difference between the first waveform and the second waveform are configured to provide an electric field between the first electrode and the second electrode which is asymmetric and has a time-averaged value substantially equal to zero.

For high-field symmetric-waveform filtering of high mobility ions, the second symmetric waveform is removed from the second electrode. The first waveform produces a symmetric electric field waveform in the gap. The constant gap distance and the amplitude and frequency of the first waveform are configured to filter high mobility ions in the gap.

In various embodiments, for high-field symmetric-waveform filtering of high mobility ions, a third symmetric waveform is applied to the second electrode. The first waveform and the third waveform produce a symmetric electric field waveform in the gap. The amplitude and frequency of the first waveform and the amplitude and frequency of the third waveform are configured to filter high mobility ions in the gap.

Various embodiments include configuring the apparatus so that it is switchable between a high-field asymmetric-waveform apparatus for differential ion mobility spectrometry and a high-field symmetric-waveform apparatus for fragmenting ions. The apparatus also further includes a first high-voltage waveform generator, a second high-voltage waveform generator, a phase adjusting circuit, and a switching circuit. The first waveform generator is configured to produce a first symmetric waveform, and the second waveform generator is configured to produce a second symmetric waveform. The phase adjusting circuit is configured to adjust the phase of one of the waveform generators.

For differential ion mobility spectrometry, the switching circuit electrically connects the first waveform generator to first electrode and electrically connects the second waveform generator to the second electrode. An electric field waveform created in the gap between, resulting from the application of the first waveform and second waveform, is asymmetric and has a time-averaged value substantially equal to zero.

For high-field symmetric-waveform ion fragmentation, the switching circuit electrically connects the first waveform generator to the first electrode and electrically disconnects the second waveform generator from the second electrode. The first waveform produces a symmetric electric field waveform in the gap. As described above, the amplitude of the first symmetric waveform is configured to produce the electric field waveform in the gap with maximum electric field strength greater than 25,000 V/cm for an atmospheric pressure gap, or approximately 100 Td, to fragment ions in the gap. In addition, the amplitude and frequency of the first symmetric waveform, and the gap height are all configured to transmit all ions in the gap. Alternatively, the amplitude and frequency of the first symmetric waveform, and the gap height may be configured to simultaneously filter high mobility ions. This mode of operation can be beneficial for reducing chemical background. This mode of operation can be beneficial for reducing chemical background by declustering chemical noise to smaller, higher mobility ions, and then filtering the high mobility ions.

In various embodiments, for high-field symmetric-waveform ion fragmentation, the switching circuit does not electrically disconnect the second waveform generator from the second electrode. Instead, phase adjusting circuit is adjusted to produce the symmetric electric field waveform in the gap. The amplitude and frequency of the first symmetric waveform and the amplitude and frequency of the second symmetric waveform are then configured to fragment specific (targeted) ions in the gap.

Various embodiments include a method for configuring the apparatus so that it is switchable between a high-field asymmetric-waveform apparatus for differential ion mobility spectrometry and a high-field symmetric-waveform apparatus for fragmenting ions. For differential ion mobility spectrometry, a first sinusoidal is applied to the first electrode and a second symmetric waveform is applied to the second electrode. A ratio of the amplitude of the first waveform to the amplitude of the second waveform and a relative phase difference between the first waveform and the second waveform are configured to provide an electric field between the first electrode and the second electrode which is asymmetric and has a time-averaged value substantially equal to zero.

For high-field symmetric-waveform ion fragmentation, the second symmetric waveform is removed from the second electrode. The first waveform produces a symmetric electric field waveform in the gap. The constant gap distance and the amplitude and frequency of the first waveform are configured to fragment and transmit ions in the gap.

In various embodiments, for high-field symmetric-waveform filtering of high mobility ions, a third symmetric waveform is applied to the second electrode. The first waveform and the third waveform produce a symmetric electric field waveform in the gap. The amplitude and frequency of the first waveform and the amplitude and frequency of the third waveform are configured to fragment and transmit ions in the gap.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

FIG. 13A is a plot showing exemplary waveforms applied to the electrodes of FIG. 10 and a resulting asymmetric waveform, in accordance with various embodiments.

Figure 1:
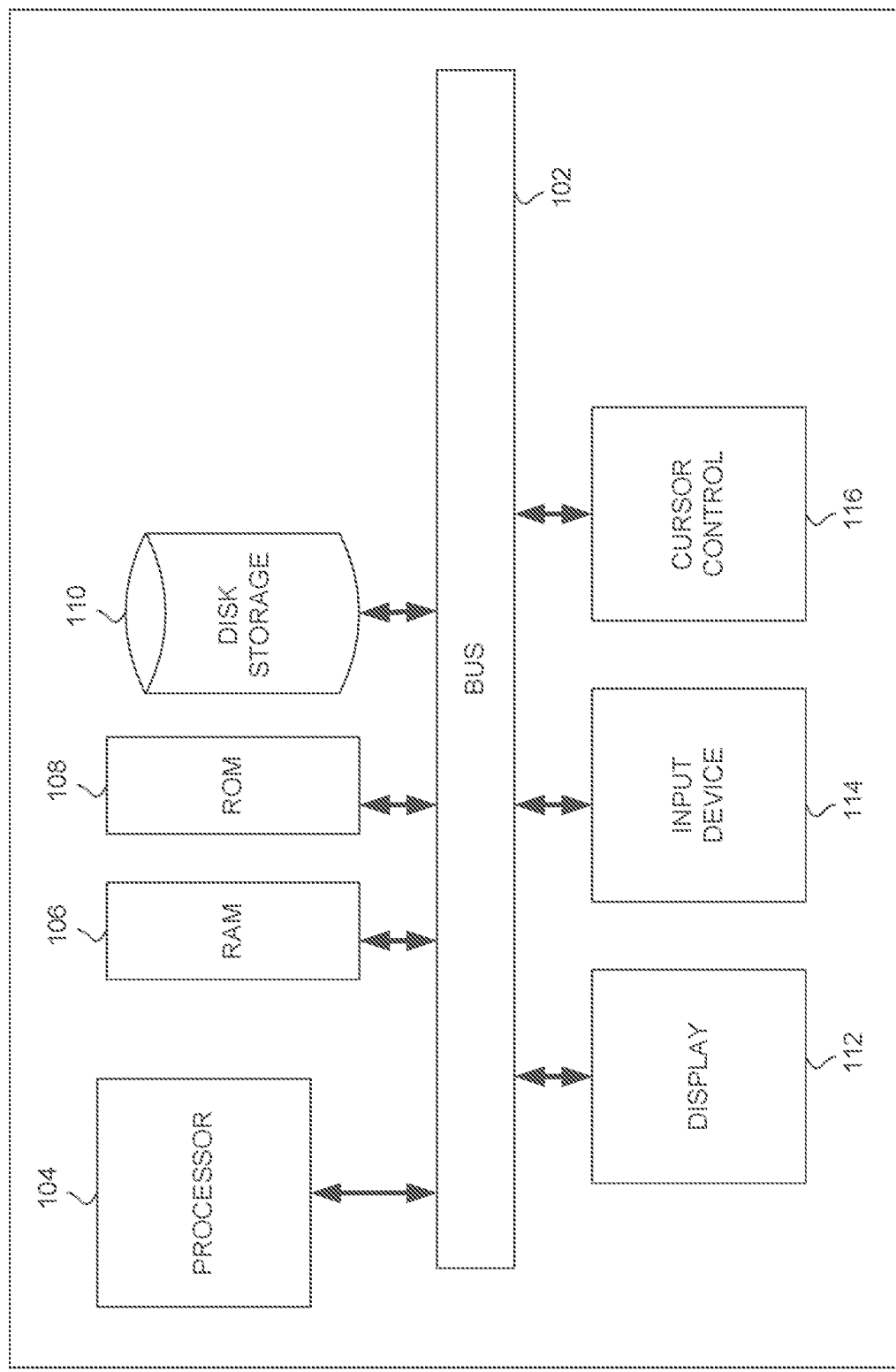
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

High-Frequency and High-Voltage Ion Filters

As described above, instrumental contamination that can impact the performance of a mass spectrometer is of increasing concern. Contamination can be caused by both high and low mobility ions. High mobility contaminant ions have been removed using conventional high-frequency and high-voltage FAIMS or DMS devices. High mobility contaminant ions have also been removed using low-frequency and low-voltage devices.

One exemplary low-frequency and low-voltage device called a low-mobility-pass filter (LMPF) consisted of two rectangular plates separated by a channel for gas flow between the plates. A low-frequency, low-amplitude symmetric waveform was applied to one plate while the other was grounded. The applied symmetric waveform caused high mobility ions to collide and be discharged by the plates, while low mobility ions did not reach the plates and passed through the filter.

This low-frequency and low-voltage planar LMPF produced mass spectra where high mobility contaminant ions could be removed with an efficiency near 100%. However, the relatively broad response function of the low-frequency and low-voltage planar LMPF suggested that it could not match the S/N ratios of high-frequency and high-voltage FAIMS or DMS devices. In addition, the low-frequency and low-voltage planar LMPF was directed only to the removal of high mobility contaminant ions. As a result, it could not be used to filter other contaminants such as very low mobility asteroids.

Consequently, systems and methods are needed to filter or remove contaminant ions at S/N ratios approaching high-frequency and high-voltage FAIMS or DMS devices and to filter contaminant ions with lower mobilities and higher m/z values. The terms "FAIMS" and "DMS" as used herein are synonymous and interchangeable. As a result, the term FAIMS is used in the remainder of the specification.

FAIMS Device Properties

In various embodiments, it is observed that conventional FAIMS devices have two properties that are useful for ion contaminant filtering. The first property is the ability to decluster and/or fragment ions based on the strength of the electric field. The second property is the ability to transmit ions through the device based on a frequency dependent effective gap.

Declustering or Fragmenting Under the Effect of Strong Electric Fields

When ions move in gaseous media under the effect of strong electric fields, their kinetic energy increases, which leads to increased ion temperature. The extent of ion heating depends upon the average kinetic energy ions acquired between collisions with bulk gas molecules $\Delta\varepsilon_i$. The kinetic energy that an ion acquires from the electric field between collisions is equal to $$\Delta\varepsilon_i = eE\lambda = \frac{e}{\Omega}\frac{E}{N}$$

where e is the elemental charge, E is the electric field, N is the number density, and $\Omega$ is the cross-sectional collision integral. In a strong electric field, ions can gain sufficient internal energy to decluster complexes or fragment covalent bonds.

In FAIMS, a strong asymmetric electric field is used, and there are a number of examples in the literature that demonstrate the process of fragmentation. For example, it has been shown that a FAIMS device can fragment dimers of imidazole to the monomer state at atmospheric pressure. Using a radio frequency (RF) separation voltage (SV) of 1100 V across the plates of a FAIMS device (0.5 mm gap height), the cation $M_2H+$ of a dimer of imidazole was completely eliminated with a corresponding increase in the intensity of the MH+ signal. Similarly, the fragmentation of anions containing imidazole $(M_2O_2^-\rightarrow MO_2^-\rightarrow (M-H)^-)$ was also observed. As a result, in FAIMS devices, fragmentation occurs due to the heating of ions when a sufficiently strong asymmetric (RF) waveform is applied.

Effective Analytical Gap and Its Dependence on Frequency of the Electric Field

FAIMS systems may include a mobility cell sealed to the vacuum inlet of a mass spectrometer, typically with two parallel electrodes that are spaced apart. The sealed design approach provides a transport gas flow, which carries ions and charged particles through the mobility cell. Under the influence of an asymmetric waveform electric field, ions may be separated in the mobility cell based upon the difference between an ion's high and low field mobility. A targeted ion species may be selected by applying a specific combination of direct current (DC) voltage, which is called compensation voltage (CoV), and asymmetric waveform alternating current (AC) voltage, which is called separation voltage (SV), between the two plates to filter targeted ions as they are swept towards the mass spectrometer. Since the range of CoV values for different ions may vary widely, it is not possible to transmit all ions with a single CoV value. The term effective gap has been used previously in FAIMS to describe the difference between the mobility cell gap height (spacing between the plates) and the radial displacement of the radial oscillations of ions due to the asymmetric waveform.

Figure 2:
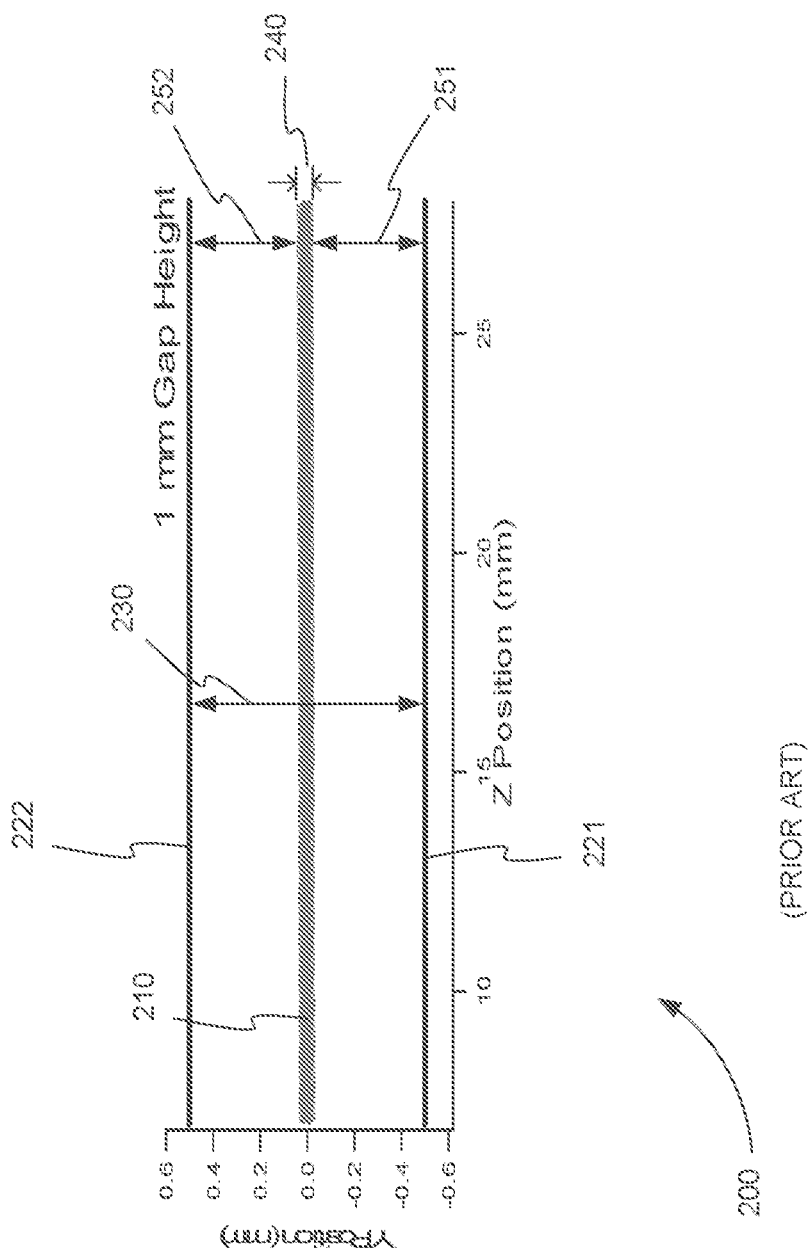
FIG. 2 is a cross-sectional side view of a high-field asymmetric-waveform spectrometer (FAIMS) mobility cell showing the simulated radial oscillations for proline ions within the cell (analytical gap height=1 mm). This example demonstrates ion movement in a broad gap, where d>>ion oscillation distance ($\Delta S$).

FIG. 2 is a cross-sectional side view 200 of a FAIMS mobility cell showing the simulated radial oscillations for proline ions within the cell (analytical gap height=1 mm). This example demonstrates ion movement in a broad gap, where d>>ion oscillation distance ($\Delta S$).

Trajectories of ions with radial oscillations 210 are simulated between plates 221 and 222. The proline ions are oscillated at a frequency of 3 MHz, for example. The mobility cell gap height 230 is the distance between plates 221 and 222. Mobility cell gap height 230 is 1 mm, for this example. Distance 240 is the radial displacement of ion radial oscillations 210. The total effective gap of the mobility cell for ion radial oscillations 210, is, therefore, the difference between mobility cell gap height 230 and distance 240. In other words, the effective gap is the sum of distances 251 and 252.

A larger effective gap, like that shown in FIG. 2, is desirable for effective ion transmission through the mobility cell. In contrast, when the effective gap approaches 0 mm (which can be achieved by applying high intensity AC voltage, decreasing frequency, decreasing pressure, or decreasing gap height) all ions may be neutralized on the plates due to large radial oscillations. FAIMS mobility cells are usually designed to account for this, one rule of thumb being to maintain an effective gap that is at least 85% of the total gap height for a given mobility cell. This means that to provide high ion transmission for targeted ion species their maximum oscillation distance should be decreased, which can be achieved by increasing the frequency or reducing the amplitude of the AC voltage.

Figure 3:
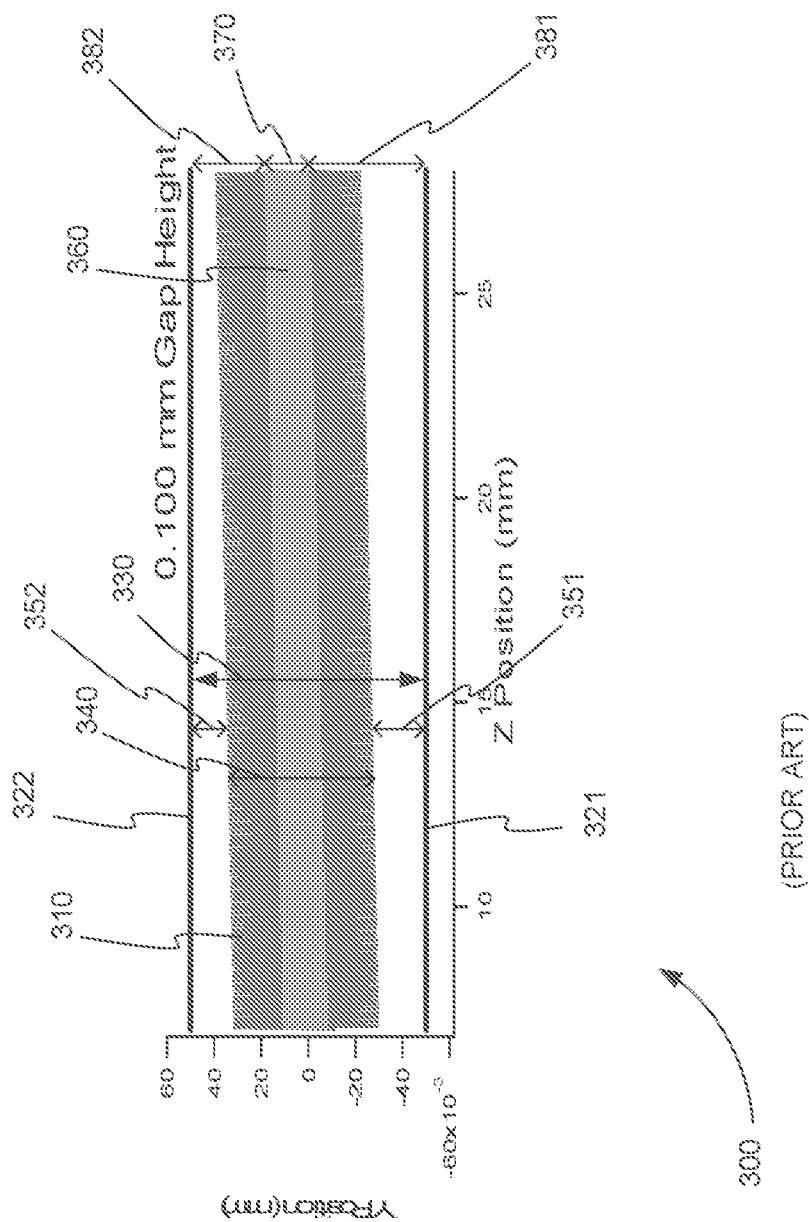
FIG. 3 is a cross-sectional side view of a FAIMS mobility cell with a gap height (0.1 mm) that is one tenth of the gap height of the mobility cell of FIG. 2, showing two different simulated radial oscillations for proline ions within the cell at two different frequencies.

FIG. 3 is a cross-sectional side view 300 of a FAIMS mobility cell with a gap height (0.1 mm) that is one tenth of the gap height of the mobility cell of FIG. 2. FIG. 3 shows two different simulated radial oscillations (370 and 310) for proline ions within the cell at two different frequencies. Radial oscillation 340 was obtained for the same frequency (3 Mhz) of the AC waveform, which was used for FIG. 2, and second trajectory 370 was generated using an increased frequency. The mobility cell gap height 330 is the distance between plates 321 and 322. Mobility cell gap height 330 is 0.1 mm, for example, or one tenth of the gap height of the mobility cell of FIG. 2.

First radial oscillations 310 are simulated between plates 321 and 322 with a frequency of 3 MHz, for example. Distance 340 is the radial displacement of first ion radial oscillations 310. The effective gap of the mobility cell for first ion radial oscillations 310, is, therefore, the difference between mobility cell gap height 330 and distance 340. In other words, the effective gap is the sum of distances 351 and 352.

Second radial oscillations 360 are simulated between plates 321 and 322 with a higher frequency of 10 MHz, for example. Distance 370 is the radial displacement of second ion radial oscillations 360. The effective gap of the mobility cell for second ion radial oscillations 360, is, therefore, the difference between mobility cell gap height 330 and distance 370. In other words, the effective gap is the sum of distances 381 and 282.

Referring back to FIG. 2, ion radial oscillations 210 extend over approximately 70 μm range (distance 240), yielding an effective gap of 930 μm (distances 251 and 252), or 93% of the gap height 230. The situation is very different in FIG. 3, however, where the effective gap for first ion radial oscillations 310 with the 3 MHz generator is on the order of 30 μm (distances 351 and 352). Clearly increasing the frequency of the generator to 10 MHz to produce second ion radial oscillations 360 improves the effective gap (distances 381 and 382).

The radial oscillations for a given ion increase with ion mobility, meaning that ions with lower m/z (consequently higher mobility) are expected to have greater radial oscillation than ions with higher m/z. The goal in FAIMS is to maximize the effective gap.

FAIMS Device with a Symmetric Waveform

Although FAIMS devices have two properties that are useful for ion contaminant filtering, as conventionally configured, they are not well suited for this task. As described above, the successful application of these devices depends on user knowledge of analyte ion mobility. In addition, fragmentation in conventional FAIMS devices can be problematic. It can be problematic because it leads to discontinuities in CoV ramp data when ions fragment within a FAIMS cell and the precursor ions and product ions have different optimal CoV values. Additionally, only the very small portion of the ion population that has a correctly optimized CoV will be transmitted, rather than the entire population.

In various embodiments, a FAIMS device is modified to filter contaminant ions. In particular, a FAIMS mobility cell is configured to apply a radial symmetric waveform between its two electrode plates rather than an asymmetric waveform. Such a device can be separately operated to remove high mobility ion contaminants, such as low m/z chemical noise, or to decluster or fragment low mobility ion contaminants, such as asteroids. In both cases, the symmetric waveform is applied with a high amplitude (meaning high voltage and high electric field) and high frequency. Also, in both cases no DC offset voltage is applied to the electrodes of the FAIMS mobility cell (CoV=0 V), so there is no net movement of ions from the center of the channel as they oscillate down the channel.

In various embodiments, in order to filter out high mobility ion contaminants, a sinusoidal waveform is applied across the electrodes of the FAIMS mobility cell. It will be understood by those of skill in the relevant art that any symmetric waveform may be used, including sinusoidal, cosinusoidal, square waveforms, or any combination of these waveforms. The amplitude and frequency of the sinusoidal waveform are optimized to selectively adjust the effective gap to zero for ions of high mobility, while still transmitting ions with lower mobility. In various embodiments, the gap height of the FAIMS mobility cell is also optimized to filter out the high mobility ion contaminants. This operation of the FAIMS mobility cell produces a low-mobility-pass filter (LMPF) that eliminates all ions with mobility greater than a selected value. This cell can eliminate low m/z chemical background that is normally observed in mass spectra.

In various embodiments, in order to decluster or fragment low mobility ion contaminants, a sinusoidal waveform is also applied across the electrodes of the FAIMS mobility cell. The sinusoidal waveform oscillates ions being carried within a transport gas as they move through the cell. The amplitude of the sinusoidal waveform is optimized to heat the ions for declustering or fragmentation prior to the inlet orifice. The frequency of the sinusoidal waveform is optimized to transmit all ions to the vacuum system without mobility filtration. This mode of operation may be most useful for limiting the clustered peaks reaching a downstream mass spectrometer, including asteroids.

In various embodiments, two or more FAIMS devices with symmetric waveforms are used in series to remove both high and low mobility contaminant ions. For example, a first FAIMS device with symmetric waveform is operated to decluster or fragment low mobility ion contaminants. The resulting high mobility products are then transmitted to a second FAIMS device with symmetric waveform. The second FAIMS device is operated to filter out the high mobility products of the low mobility contaminant ions and any other high mobility contaminant ions it receives. In some embodiments, a single FAIMS device removes both high and low mobility contaminant ions by fragmenting lower mobility ions to generate higher mobility fragments, and then filtering the higher mobility fragments by adjusting the effective gap.

High Strength Versus Low Strength Field

As described above, the low-frequency and low-voltage planar LMPF of Menlyadiev et al. also applied a symmetric waveform across the electrodes of a structure similar to a FAIMS mobility cell. However, Menlyadiev et al. explicitly taught away from a symmetric waveform with a high-frequency and high-voltage.

They explained that during one half of a symmetric waveform, an ion is moved radially a distance y according to $y=K \times E \times t$, where K is the mobility coefficient, E is the electric field strength, and $t=T/2$ is the half period of the waveform. They specifically said that they limited the field strength of (applied a low enough voltage to) their device to prevent changes to the mobility coefficient K. In other words, they applied a low voltage to their device so that K would remain a constant K(0) and not vary with voltage. They said that this was unlike a FAIMS device where the high electric field strength caused the mobility coefficient K to change with the electric field (or with voltage), becoming a function of the electric field E, or K(E). Higher voltages require higher frequencies to maintain an effective gap, so by teaching away from higher voltages, they also taught away from higher frequencies.

Menlyadiev et al. have distinguished devices characterized by low voltages and weak electric fields (low field regime), low frequencies, and $K_0$ from devices characterized by high voltages and strong electric fields (high field regime), high frequencies, and K(E), because these two different types of devices affect ions physically in different ways. Under low field conditions the ion energy is low relative to the thermal energy of gas molecules, so ionic motion is largely random with a small superimposed drift component due to the field. However, in the high field regime ions acquire average energy substantially in excess of thermal energy, resulting in directed motion along the field lines as well as an additional random component of motion due to collisions with molecules. Under these conditions, trajectories are affected by scattering processes and the mobility becomes field dependent; it is no longer a constant value. Therefore, there are fundamental changes in the nature of ion-molecule interactions when operating at high fields.

In addition to the mobility change, operation at high fields can induce fragmentation. In contrast to Menlyadiev et al., operating at high voltage is like firing a billiard ball at other billiard balls using a powerful cannon such that collisions among billiard balls cause the billiard balls to deform or fragment. In this case, the calculation of the trajectories of the billiard balls is not just a function of velocity and mass. Instead, the trajectories are a function of the physical deformation or change to the material of the billiard balls or to the atoms of ions.

In regard to atoms or molecules, deformation is actually the collision of the outside electronic orbitals of the molecule. Collisions are, therefore, a function of the interaction of those orbitals. If the voltage is high enough, a series of collisions can actually lead to fragmentation of the covalent bonds. Therefore, changing an ion mobility device from low field to high field transforms the ion mobility to a field dependent region rather than just K(0).

As is understood in the art, the functional parameter that determines the average ionic energy acquired from the electrical field, sometimes referred to as the "field energy" is the electrical field strength E divided by the pressure p or gas number density N, that is, respectively, E/p or E/N. The plotting of ion mobility versus E/N is a well understood convention in the field and used herein for convenience and conciseness of explanation. Accordingly, it is to be understood that increasing the field energy by raising the electrical field strength can also be accomplished by lowering the gas pressure (and hence number density), or a combination of both raising the electrical field strength and lowering the gas pressure. For this reason, it is convenient to discuss field strengths in terms of Townsend (Td) units or E/N, whereby at atmospheric pressure the number density for nitrogen molecules is $2.5 \times 10^{19}$ molecules/cm$^3$ at 295 K. Therefore, a 5000 V/cm field would be approximately $2 \times 10^{-16}$ Vcm$^2 \times$ ($1 \times 10^{17}$ Td)=20 Td.

Figure 4:
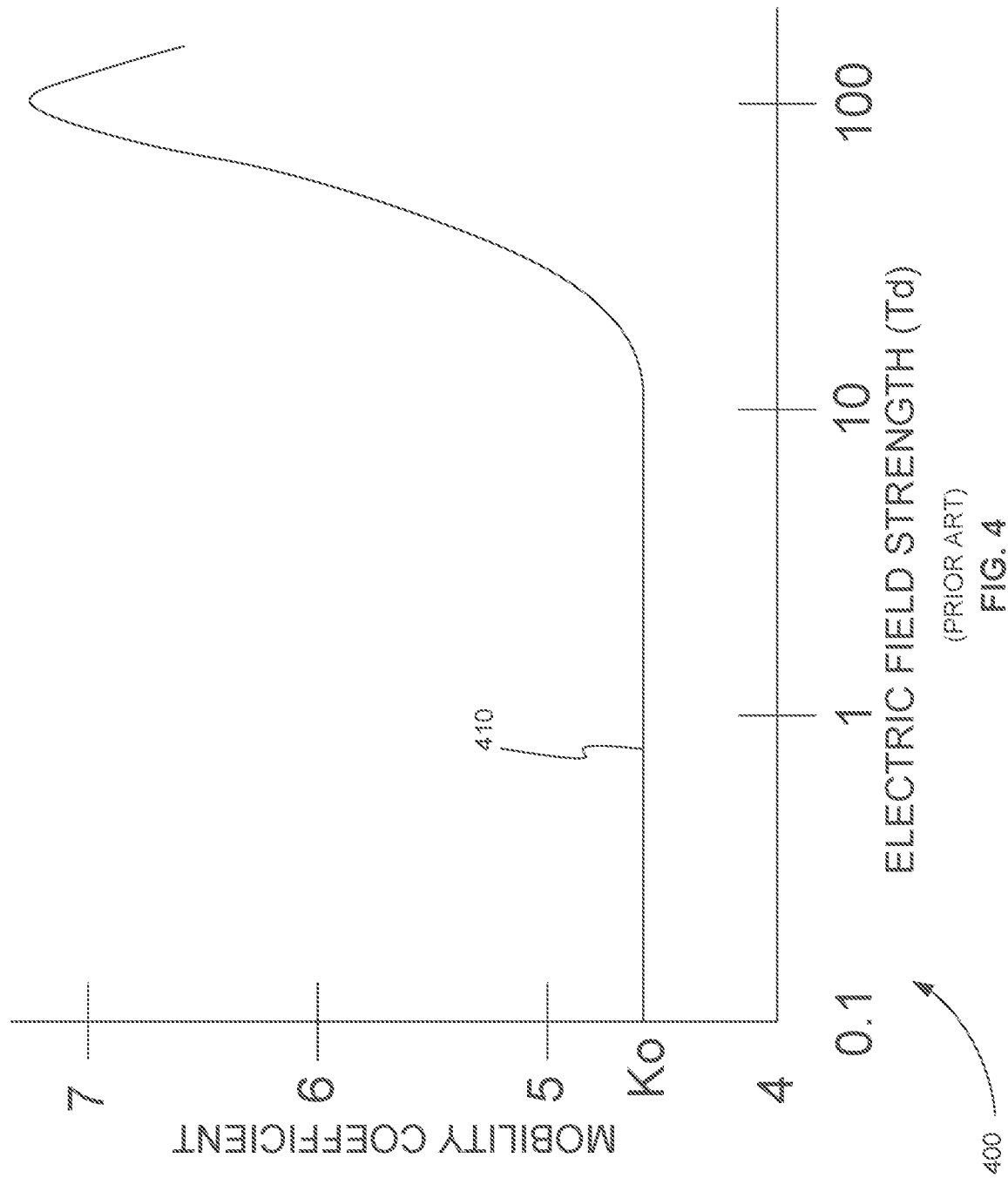
FIG. 4 is a plot showing how the mobility coefficient, K(E/N) of a particular ion species varies with electric field strength (E/N).

FIG. 4 is a plot 400 showing how the mobility coefficient, K(E/N) of a particular ion species varies with electric field strength (E/N). Mobility coefficient curve 410 shows that the coefficient of mobility is a constant, K(0), until the density normalized electric field strength reaches about 10 Td. After 10 Td, mobility coefficient 410 becomes a nonlinear function of the electric field, K(E). The mobility coefficient curve 410 is characteristic of an ion moving through a polarizable medium. When the density normalized electric field increases to greater than about 10 Td, the ion velocity increases relative to the thermal speed of the gas molecules and the contribution of long term interaction (between ions and gas molecules), and polarization effects are minimized, which leads to increasing ion velocity. Under these conditions, the ion mobility increases. However, at very high fields (E/N~100 Td or greater) hard sphere interactions between ions and gas molecules start to contribute to the ions' behavior, which leads to decreased mobility with increasing electric field. This decrease in mobility is normally associated with higher energy ion—molecule interactions that sample the more repulsive part of the interaction potential. As demonstrated in FIG. 4, ion molecule interactions are substantially different at very low and high fields. It will be apparent to those of skill in the relevant art that different ion species will exhibit different field dependent mobility behavior, and this can be used for chemical identification and filtration purposes. For instance, the ion mobility coefficient K(E) may also monotonically increase or decrease with increasing electric field.

Again, for a low electric field strength (E/N<10 Td), the ions maximum oscillation distance (based upon a constant mobility coefficient, K(0), which is related to mass) can be determined from $$\Delta S = \Delta S_{max} - \Delta S_{min} = 2\frac{K(0) * Eo}{\omega}.$$

In other words, for low electric field strengths, E/N<10 Td, ions with similar mass values have similar oscillations. If the mobility coefficient of a different ion were plotted in FIG. 4 and that different ion had a mass close to the mass of the ion plotted in FIG. 4, the mobility coefficient of the different ion would have a similar K(0) at an electric field of <10 Td. Note that the terms "mass" and "m/z" are used interchangeably herein. Generally, mass spectrometry measurements are made in m/z and converted to mass by multiplying charge.

In contrast to low electric field ion movement, for a high electric field strength (E/N>10 Td), ion oscillation should include the dependence of the coefficient of mobility coefficient on the electric field, K(E). This means that K(E) is no longer directly related to mass. Ion separation unrelated to mass is possible. In other words, for high electric field strengths, ions with similar mass values can have significantly different mobilities, which can be used for their separation and identification. So if the mobility coefficient of a different ion was plotted in FIG. 4 and that different ion had a mass close to the mass of the ion plotted in FIG. 4, the nonlinear portion of the mobility coefficient 410 may be different.

Apparatus with a High Strength Symmetric Waveform for Ion Filtering

Figure 5:
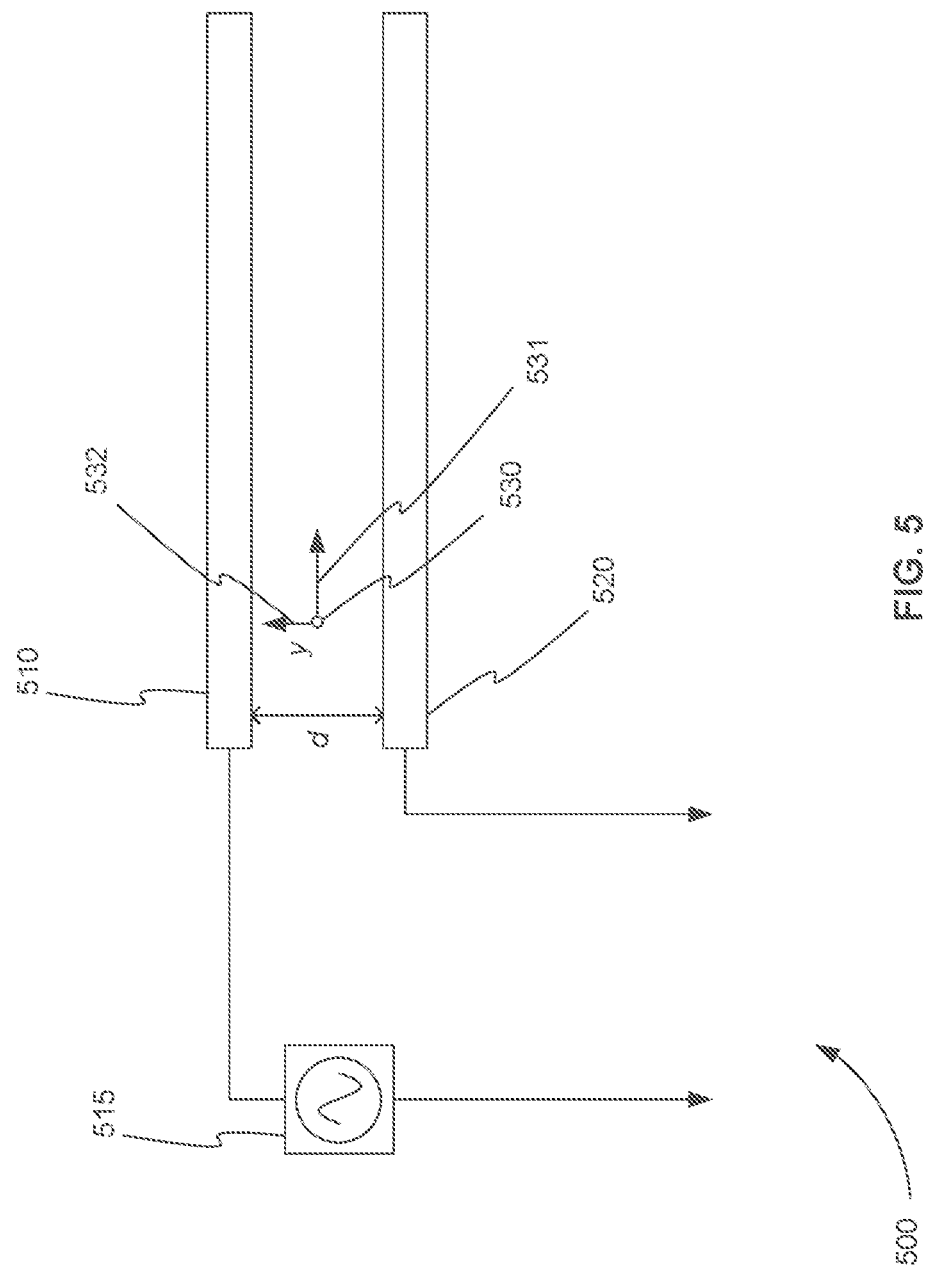
FIG. 5 is a schematic diagram of a high-field symmetric-waveform apparatus for removing high mobility ions, in accordance with various embodiments.

FIG. 5 is a schematic diagram 500 of a high-field symmetric-waveform apparatus for removing high mobility ions, in accordance with various embodiments. The apparatus includes first electrode 510, second electrode 520, and first high-voltage waveform generator 515. First electrode 510 and second electrode 520 can be, e.g., parallel strip electrodes, parallel plate electrodes, concentric cylinders, spherical or other shape curved elements, etc. Common to all these different possible configurations is a second electrode 520. The second electrode 520 is placed in parallel with the first electrode to provide constant gap distance (height), d, between first electrode 510 and second electrode 520. In addition, there is a laminar gas flow stream directed along the analytical gap, and this flow stream is used for dragging all ion species along the analytical gap. The gas pressure in the gap may be close to ambient pressure, or depending on the application, it may be lower or higher than atmospheric pressure, for example.

First high-voltage waveform generator 515 is electrically connected to first electrode 510. First high-voltage waveform generator 515 is configured to produce a first symmetric or harmonic waveform. The first symmetric waveform can be a sinusoidal waveform, $E(t)=Eo*Sin(\omega t-\phi)$, that produces a symmetric sinusoidal electric field waveform in the gap between first electrode 510 and second electrode 520 with a maximum electric field strength, Eo. When Eo is greater than 2,500 V/cm or has a field strength greater than 10 Td, the mobility coefficient of ions in the gap usually shows dependence upon E/N.

Under the effect of the harmonic electric field waveform ions 530 oscillate in a direction perpendicular to the axial movement of ions under the effect of the gas stream. The distance, y, in which an ion 530 is displaced radially from the center of the gap in direction 532 during one half of the electric field waveform is given by $y=K(E) \times E \times t$, where K(E) is the mobility coefficient and t is the half period of the electric field waveform.

The constant gap distance and the amplitude and frequency of the first symmetric waveform are configured to filter high mobility ions by producing the electric field waveform with an Eo and t that causes ions in the gap with a $K(E) \geq (d/(2 \times E \times t))$ to impact the first electrode or the second electrode and be removed. The E and t produced also cause ions in the gap with a $K(E) < (d/(2 \times E \times t))$ to pass through the gap or to be transmitted.

In various embodiments, the apparatus can further include a pumping device (not shown) to increase or decrease a pressure in the gap. As a result, the pressure, the constant gap distance, and the amplitude and frequency of the first symmetric waveform are configured to filter high mobility ions.

In various embodiments, first high-voltage waveform generator 515 is in communication with a processor or controller (not shown). The processor or controller can be, but is not limited to, the system of FIG. 1, a computer, microprocessor, or any device capable of sending and receiving control information and data to and from first high-voltage waveform generator 515. The processor or controller can be a processor or controller of a mass spectrometer, for example.

In FIG. 5 the symmetric electric field waveform in the gap between first electrode 510 and second electrode 520 is produced using only one sinusoidal waveform from one generator, first high-voltage waveform generator 515. Second electrode 520 is grounded, for example. In various embodiments, both electrodes may be floated to a specific DC potential to form an integrated inlet for a mass spectrometer. In various embodiments, the symmetric electric field waveform in the gap between first electrode 510 and second electrode 520 is produced using two sinusoidal waveforms from two waveform generators.

Figure 6:
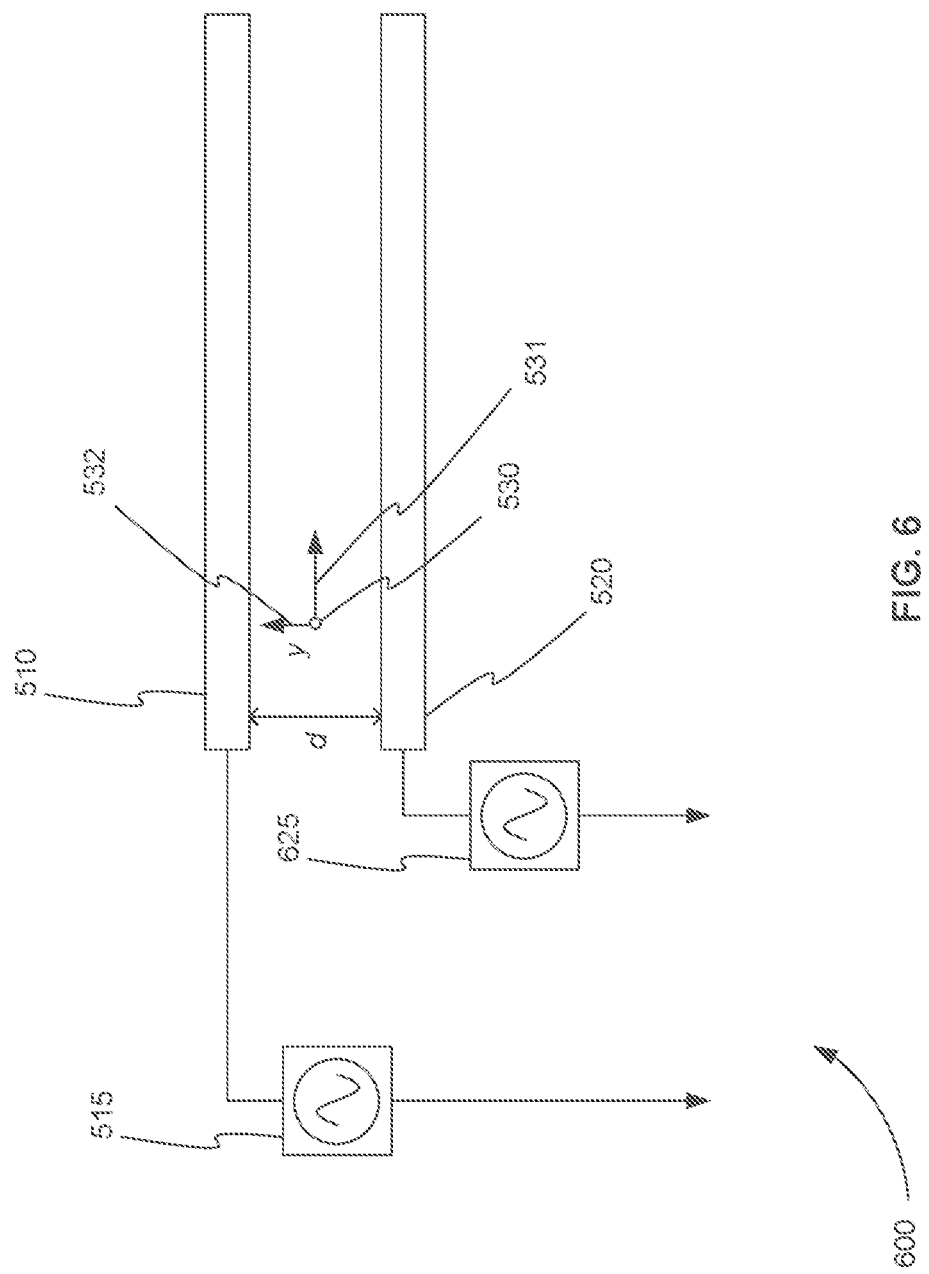
FIG. 6 is a schematic diagram of a high-field symmetric-waveform apparatus for removing high mobility ions using two waveform generators, in accordance with various embodiments.

FIG. 6 is a schematic diagram 600 of a high-field symmetric-waveform apparatus for removing high mobility ions using two waveform generators, in accordance with various embodiments. The apparatus includes first electrode 510, second electrode 520, first high-voltage waveform generator 515, and second high-voltage waveform generator 625. Second electrode 520 is placed in parallel with the first electrode to provide constant gap distance, d, between first electrode 510 and second electrode 520.

First high-voltage waveform generator 515 is electrically connected to first electrode 510. First high-voltage waveform generator 515 is configured to produce a first symmetric waveform. Second high-voltage waveform generator 625 is electrically connected to second electrode 520. Second high-voltage waveform generator 625 is configured to produce a second symmetric waveform. The first symmetric waveform can be, but is not limited to, a symmetric sinusoidal waveform. The second symmetric waveform can be, but is not limited to, a symmetric sinusoidal waveform.

The first symmetric waveform and the second symmetric waveform produce a symmetric electric field waveform in the gap between first electrode 510 and second electrode 520 with a maximum electric field strength, E. E is greater than 2,500 V/cm or has a density normalized field strength greater than 10 Td in order to make the mobility coefficients K of ions in the gap a function of E. The electric field waveform radially displaces an ion 530 traveling in direction 531 from the center of the gap in direction 532. The distance, y, in which ion 530 is displaced radially from the center of the gap in direction 532 during one half of the electric field waveform is given by y=K(E)×E×t, where K(E) is the mobility coefficient and t is the half period of the electric field waveform.

The amplitude and frequency of the first symmetric waveform and the amplitude and frequency of the second symmetric waveform, as well as the gap height, are configured to filter high mobility ions by producing the electric field waveform with an E and t that causes ions in the gap with a K(E)≥(d/(2×E×t)) to impact the first electrode or the second electrode and be removed. The E and t produced also cause ions in the gap with a K(E)<(d/(2×E×t)) to pass through the gap or to be transmitted.

In various embodiments, the apparatus of FIG. 6 can further include a pumping device (not shown) to increase or decrease a pressure in the gap. As a result, the pressure, the constant gap distance, the amplitude and frequency of the first symmetric waveform, and the amplitude and frequency of the second symmetric waveform are configured to filter high mobility ions.

In various embodiments, both first high-voltage waveform generator 515 and second high-voltage waveform generator 625 are in communication with a processor or controller (not shown). The processor or controller can be, but is not limited to, the system of FIG. 1, a computer, microprocessor, or any device capable of sending and receiving control information and data to and from first high-voltage waveform generator 515 and second high-voltage waveform generator 625. The processor or controller can be a processor or controller of a mass spectrometer, for example.

Method for Ion Filtering

Figure 7:
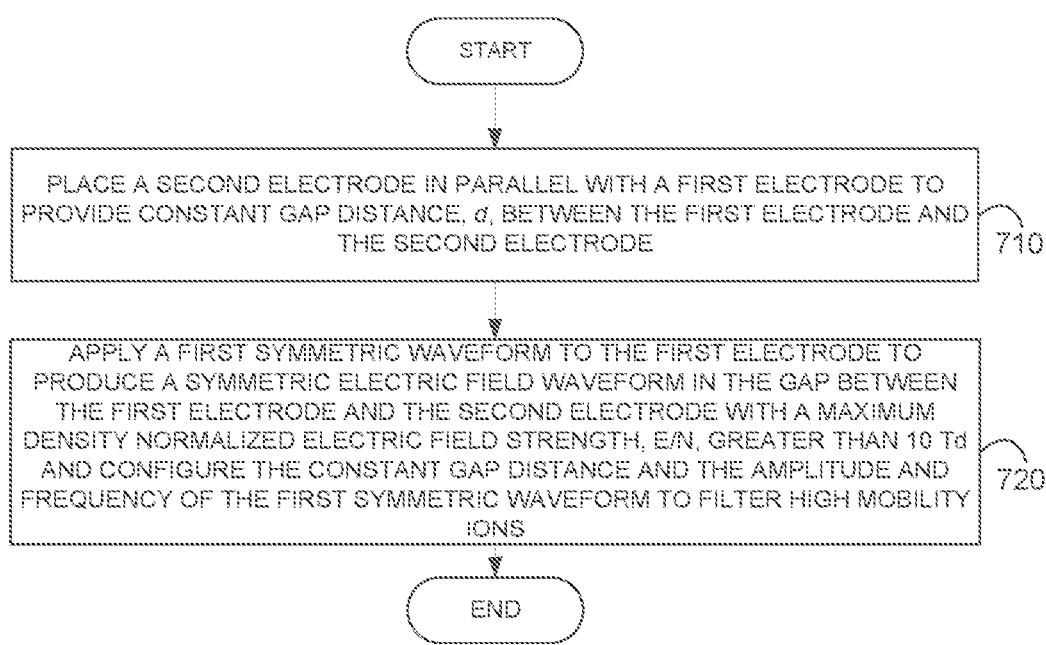
FIG. 7 is a flowchart showing a method for removing high mobility ions, in accordance with various embodiments.

FIG. 7 is a flowchart 700 showing a method for removing high mobility ions, in accordance with various embodiments.

In step 710 of the method of FIG. 7, a second electrode is placed in parallel with a first electrode to provide constant gap distance, d, between the first electrode and the second electrode.

In step 720, a first symmetric waveform is applied to the first electrode to produce a symmetric electric field waveform in the gap between the first electrode and the second electrode with a maximum density normalized electric field strength, E/N, greater than 10 Td. The electric field waveform displaces an ion radially from the center of the gap during one half of the electric field waveform a distance y=K(E)×E×t, where K(E) is the mobility coefficient and t is the half period of the electric field waveform.

The amplitude and frequency of the first symmetric waveform, as well as the gap height (d), are configured to neutralize high mobility ions. They filter high mobility ions by producing the electric field waveform with an E and t that causes ions in the gap with a K(E)≥(d/(2×E×t)) to impact the first electrode or the second electrode and be removed, and causes ions in the gap with a K(E)<(d/(2×E×t)) to pass through the gap.

In various embodiments, a second symmetric waveform is applied to the second electrode. The first symmetric waveform and the second symmetric waveform produce the symmetric electric field waveform in the gap between the first electrode and the second electrode with a maximum density normalized electric field strength, E/N, greater than 10 Td. The constant gap distance, the amplitude and frequency of the first symmetric waveform, and the amplitude and frequency of the second symmetric waveform are configured to filter high mobility ions by producing the electric field waveform. It will be apparent to those of skill in the appropriate arts that it is not critical that the waveform be sinusoidal in nature; square waveforms would also work.

Apparatus with a High Strength Symmetric Waveform for Fragmenting Ions

Returning to FIG. 5, the high-field symmetric-waveform apparatus of FIG. 5 can also be used to fragment ions. For fragmentation, the first symmetric waveform of first high-voltage waveform generator 515 is configured to produce a symmetric electric field waveform in the gap between first electrode 510 and second electrode 520 with a higher maximum electric field strength, E. Specifically, the amplitude of the first symmetric waveform is configured to produce the electric field waveform in the gap with E/N greater than 100 Td to fragment ions in the gap. In addition, the amplitude and frequency of the first symmetric waveform may be configured to transmit all ions in the gap by producing the electric field waveform with an E and t so that the distance y for each ion in the gap is less than d/2, so each ion species in the gap is transmitted through the gap with a different oscillation amplitude, corresponding to its coefficient of mobility K(E). As described above, the distance y is the distance in which ion 530 is displaced radially from the center of the gap in direction 532 during one half of the electric field waveform and is given by y=K(E)×E×t, where K(E) is the mobility coefficient and t is the half period of the electric field waveform. Alternatively, the amplitude and frequency of the first symmetric waveform may be configured to remove the highest mobility ion species.

In various embodiments, the high-field symmetric-waveform apparatus of FIG. 5 can further be modified to fragment ions using two waveform generators. Returning to FIG. 6, the high-field symmetric-waveform apparatus of FIG. 6 can also be used to fragment ions.

For fragmentation, the first symmetric waveform of first high-voltage waveform generator 515 and the second symmetric waveform of second high-voltage waveform generator 625 are configured to produce a symmetric electric field waveform in the gap between first electrode 510 and second electrode 520 with a higher maximum electric field strength, E. Specifically, the amplitude of the first symmetric waveform and the amplitude of the second symmetric waveform are configured to produce the electric field waveform in the gap with E greater than 25,000 V/cm.

Increasing the amplitude of the harmonic field can be achieved in two ways. First, by applying on first electrode for example sinusoidal waveform $V(t)=V_o \sin \omega t$, and increasing the amplitude of the harmonic voltage ($V_o$). An alternative method is the embodiment presented in FIG. 6, where a second harmonic voltage 625 was added to the second electrode 529. In this case, the waveform was the same as added on the first electrode 510 but with shifted relative phase difference to achieve a negative sinusoidal waveform $V(t)=V_o*\sin(\omega(t-\pi))=-V_o*\sin \omega t$ (see FIG. 13b). A third way to increase the strength of the harmonic field is to decrease the pressure within the gap to increase the E/N ratio. In addition, the constant gap distance, the amplitude and frequency of the first symmetric waveform, and the amplitude and frequency of the second symmetric waveform are configured to transmit all ions in the gap by producing the electric field waveform with an $E_{max}=2E_o$ and t so that the distance y for each ion in the gap is less than d/2, so each ion in the gap is transmitted through the gap.

Method for Fragmenting Ions

Figure 8:
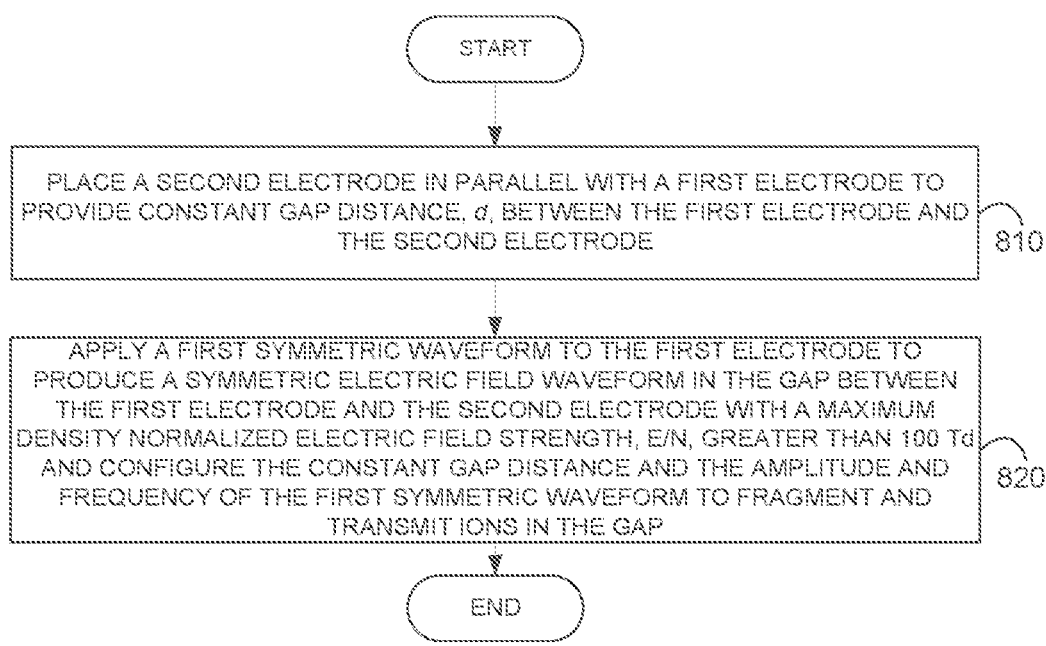
FIG. 8 is a flowchart showing a method for fragmenting ions and transmitting fragment ions, in accordance with various embodiments.

FIG. 8 is a flowchart 800 showing a method for fragmenting ions and transmitting fragment ions, in accordance with various embodiments.

In step 810 of the method of FIG. 8, a second electrode is placed in parallel with a first electrode to provide constant gap distance, d, between the first electrode and the second electrode.

In step 820, a first symmetric waveform is applied to the first electrode to produce a symmetric electric field waveform in the gap between the first electrode and the second electrode with a density normalized maximum electric field strength, E/N, greater than 100 Td. The electric field waveform displaces an ion radially from the center of the gap during one half of the electric field waveform a distance $y=K(E) \times E \times t$, where K(E) is the mobility coefficient and t is the half period of the electric field waveform.

The constant gap distance and the amplitude and frequency of the first symmetric waveform are configured to fragment ions in the gap by producing the electric field waveform with E/N greater than 100 Td and to transmit all ions in the gap by producing the electric field waveform with an E and t so that the distance y for each ion in the gap is less than d/2, so each ion in the gap is transmitted through the gap. Alternatively, the E and t can be established to filter higher mobility ions in the gap.

In various embodiments, a second symmetric waveform is applied to the second electrode. The first symmetric waveform and the second symmetric waveform produce the symmetric electric field waveform in the gap between the first electrode and the second electrode with a density normalized maximum electric field strength, E/N, greater than 100 Td. The constant gap distance, the amplitude and frequency of the first symmetric waveform, and the amplitude and frequency of the second symmetric waveform are configured to fragment and transmit ions by producing the electric field waveform.

FAIMS Device Switchable to a Symmetric Waveform

Figure 9:
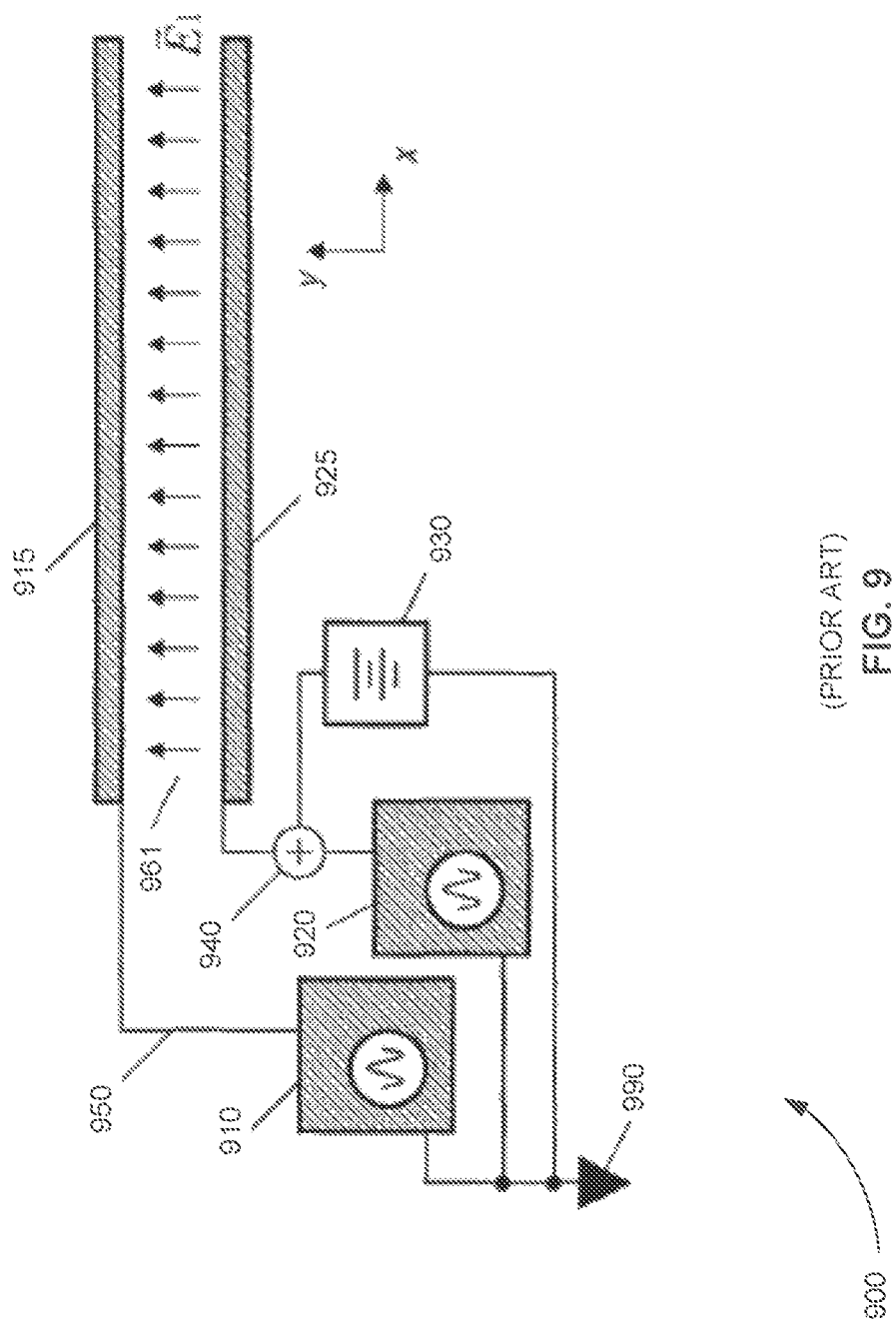
FIG. 9 is a schematic diagram of the FAIMS device of U.S. Pat. No. 7,838,822 (hereinafter the "'822 Patent").

U.S. Pat. No. 7,838,822 (hereinafter the "'822 Patent") is directed to a FAIMS device in which two high-voltage waveform generators that each produce symmetric sinusoidal waveforms are used to produce an asymmetric electric field waveform in the gap between two electrodes. FIG. 9 is a schematic diagram of the FAIMS device of the '822 Patent.

In operation, a time-varying, asymmetric, electric field 961 is created between two electrodes 915 and 925. At the same time ions travel along the gap between the two electrodes due to the transport gas stream. The high-value, time-varying, asymmetric field imparts a net drift to the ions in the y direction. In various embodiments, one high-voltage waveform generator 910 drives one electrode 915, while a second high-voltage waveform generator 920 drives a second electrode 925. An auxiliary direct-current (DC) power supply 930 can be added to the output from one generator 920 with a summing circuit device 940 to apply a substantially constant DC bias, or offset, to the electric field 961. Alternatively, the DC can be split across both electrodes. This DC bias can be used, e.g., to place a selected species of ions in a "balanced" condition between the electrodes, so they will pass through the electrodes with substantially no drift in the y direction. The two high-voltage waveform drivers 910 and 920 and the DC supply 930 share a common ground 990. The circuit elements and electrodes can be connected with electrical cables 950 suitable for carrying high-speed signals.

A phase adjusting circuit (not shown) adjusts the phase of high-voltage waveform generator 910 or high-voltage waveform generator 920. High-voltage waveform generator 910 is configured to produce a first symmetric waveform, and high-voltage waveform generator 920 is configured to produce a second symmetric waveform. The second waveform may be a harmonic of the first waveform and the ratio of the amplitude of the first waveform and the amplitude of the second waveform and the phase difference between the first waveform and the second waveform produce an electric field between first electrode 915 and second electrode 925 that is asymmetric and has a time-averaged value substantially equal to zero.

In various embodiments, a FAIMS device, like the device of the '822 Patent is modified to produce a symmetric electric field between electrodes. The symmetric electric field is then used to filter ions or to fragment and transmit ions. The FAIMS device is modified to be switchable among three modes of operation. The first mode is differential mobility spectrometry as described in the '822 Patent. The second mode is ion filtering. The third mode is ion fragmentation.

In various embodiments, the FAIMS device of FIG. 9, for example, is modified by adding a switching circuit (not shown). By switching electrode 915 to ground and turning off DC voltage supply 930, only the second symmetric waveform is applied to electrode 925 producing a symmetric electric field allowing for the two additional modes of operation. Similarly, by switching electrode 925 to ground, only the first symmetric waveform is applied to electrode 915 producing a symmetric electric field. Those of skill in the relevant arts will understand that the electrodes can be floated to a DC potential other than ground.

In various embodiments, the FAIMS device of FIG. 9, for example, is also modified by adjusting the phase of waveform generator 910 or 920 and by switching DC voltage supply 930 off. First symmetric waveform and second symmetric waveform can then together produce a symmetric electric field between electrodes 915 and 925, allowing for the two additional modes of operation.

FAIMS Device Switchable for Ion Selection by Mobility

Figure 10:
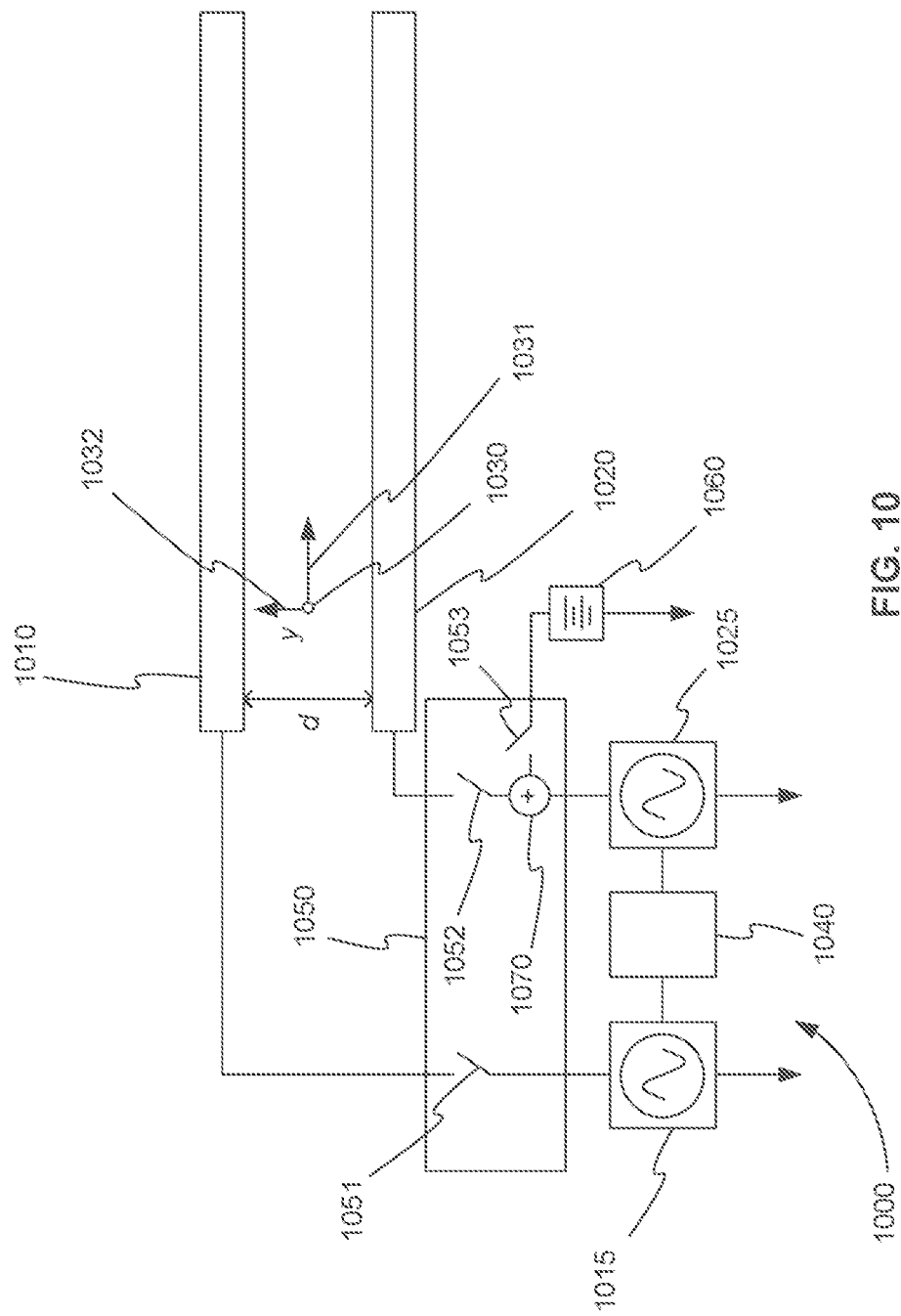
FIG. 10 is a schematic diagram of a high-field asymmetric-waveform apparatus for differential ion mobility spectrometry that is switchable to a high-field symmetric-waveform apparatus for removing high mobility ions, in accordance with various embodiments.

FIG. 10 is a schematic diagram 1000 of a high-field asymmetric-waveform apparatus for differential ion mobility spectrometry that is switchable to a high-field symmetric-waveform apparatus for removing high mobility ions, in accordance with various embodiments. The apparatus includes first electrode 1010, second electrode 1020, first high-voltage waveform generator 1015, second high-voltage waveform generator 1025, phase adjusting circuit 1040, and switching circuit 1050. First electrode 1010 and second electrode 1020 can be, e.g., parallel strip electrodes, parallel plate electrodes, concentric cylinders, curved elements, etc. Second electrode 1020 is placed in parallel with the first electrode to provide constant gap distance, d, between first electrode 1010 and second electrode 1020. The gap between first electrode 1010 and second electrode 1020 may be at atmospheric pressure, reduced pressure, or higher than atmospheric pressure, for example.

First high-voltage waveform generator 1015 is configured to produce a first symmetric waveform at a fixed or adjustable frequency and at an adjustable amplitude. Second high-voltage waveform generator 1025 is configured to produce a second symmetric waveform at a fixed or adjustable frequency and at an adjustable amplitude. The frequency of the second waveform is a harmonic of the frequency of the first waveform. Phase adjusting circuit 1040 is configured to adjust the phase of at least one of first high-voltage waveform generator 1015 and second high-voltage waveform generator 1025. Switching circuit 1050 is configurable to electrically connect or disconnect first waveform generator 1015 to first electrode 1010 using switch 1051, for example. Switching circuit 1050 is also configurable to electrically connect or disconnect second waveform generator 1025 to second electrode 1020 using switch 1052, for example.

For differential ion mobility spectrometry, switching circuit 1050 electrically connects first waveform generator 1015 to first electrode 1020 and electrically connects second waveform generator 1025 to second electrode 1020. An electric field waveform created in the gap between first electrode 1010 and second electrode 1020, resulting from the application of the first waveform and second waveform, is asymmetric and has a time-averaged value substantially equal to zero.

In various embodiments, the apparatus of FIG. 10 can further include DC voltage source 1060. DC voltage source 1060 can be added through switch 1053 of switching circuit 1050 to the output of second waveform generator 1025 with a summing circuit device 1070 to apply a substantially constant or variable DC bias, or offset, to the asymmetric electric field created in the gap between first electrode 1010 and second electrode 1020.

For high-field symmetric-waveform filtering of high mobility ions, switching circuit 1050 electrically connects first waveform generator 1015 to first electrode 1010 and electrically disconnects second waveform generator 1025 from second electrode 1020. The first waveform produces a symmetric electric field waveform in the gap between first electrode 1010 and second electrode 1020 with a maximum electric field strength, E. The first waveform is configured to produce the electric field waveform with a maximum density normalized electric field strength, E/N, greater than 10 Td, for example.

The electric field waveform displaces an ion 1030 traveling in direction 1031 radially from the center of the gap during one half of the electric field waveform a distance in direction 1032. The distance, y, in which ion 1030 is displaced radially from the center of the gap in direction 1032 during one half of the electric field waveform is given by $y=K(E) \times E \times t$, where $K(E)$ is the mobility coefficient and t is the half period of the electric field waveform. The amplitude and frequency of the first waveform as well as the gap height are configured to filter high mobility ions by producing the electric field waveform with an E and t that causes ions in the gap with a $K(E) \geq (d/(2 \times E \times t))$ to impact first electrode 1010 or second electrode 1020 and be removed, and causes ions in the gap with a $K(E) < (d/(2 \times E \times t))$ to pass through the gap.

In various embodiments, a symmetric electric field waveform is produced in the gap using the first waveform and the second waveform. For high-field symmetric-waveform filtering of high mobility ions, switching circuit 1050 electrically connects first waveform generator 1015 to first electrode 1010 and electrically connects second waveform generator 1025 to second electrode 1020. Phase adjusting circuit 1040 adjusts the phase of first waveform generator 1015 or second waveform generator 1025 to produce a combined symmetric waveform. In other words, to go from an asymmetric to symmetric waveform, phase adjusting circuit 1040 changes the relative phase of the first waveform generator 1015 and second waveform generator 1025. The first waveform and the second waveform produce a symmetric electric field waveform in the gap between the first electrode and the second electrode with a maximum electric field strength, E. The amplitude and frequency of the first waveform and the amplitude and frequency of the second waveform are configured to filter high mobility ions by producing the electric field waveform with an E and t that causes ions in the gap with a $K(E) \geq (d/(2 \times E \times t))$ to impact the first electrode or the second electrode and be removed, and causes ions in the gap with a $K(E) < (d/(2 \times E \times t))$ to pass through the gap. The first waveform and the second waveform are configured to produce the electric field waveform with a maximum density normalized electric field strength, E/N, greater than 10 Td, for example.

Method for DMS that is Switchable to Ion Filtering

Figure 11:
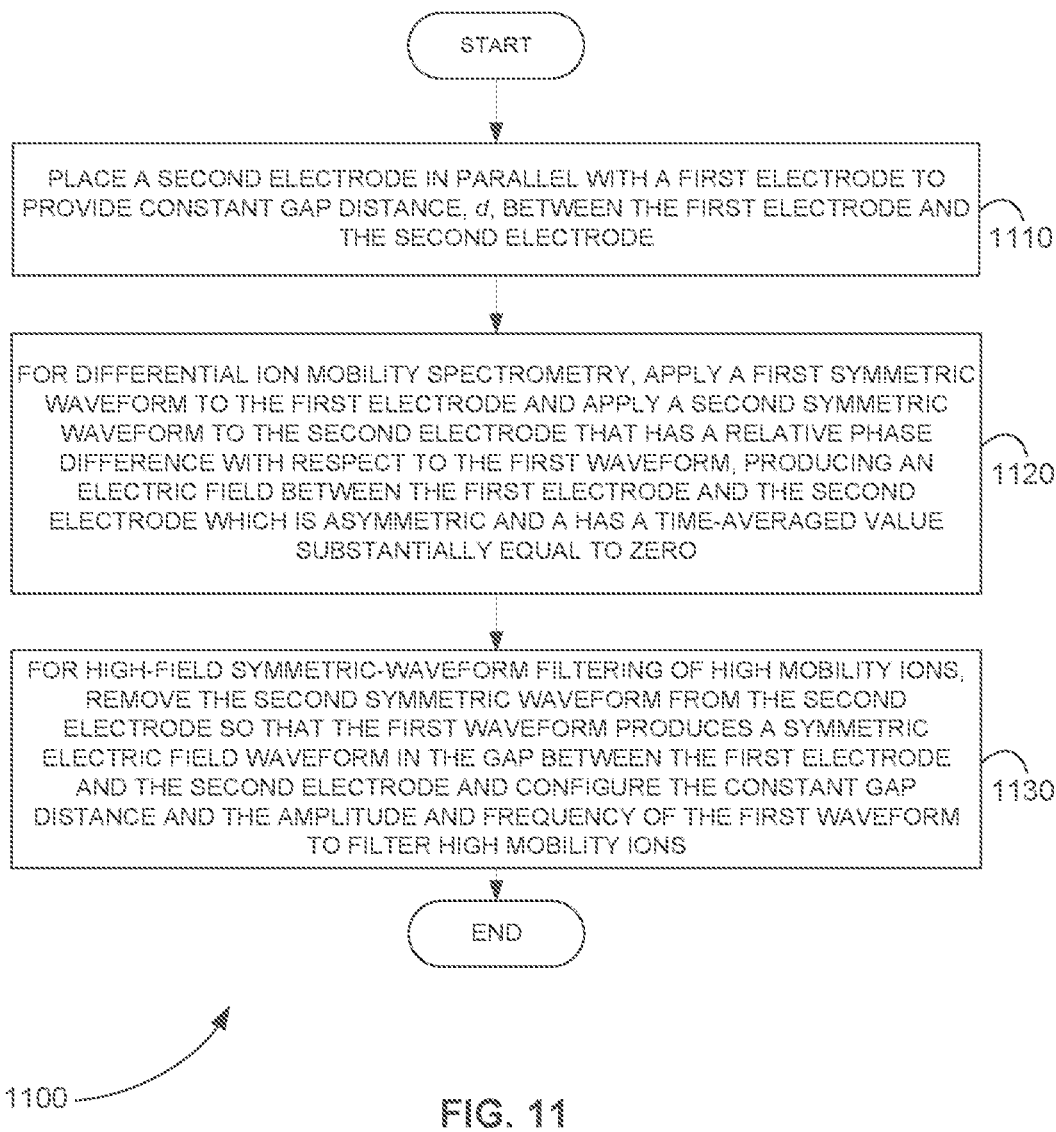
FIG. 11 is a flowchart showing a method for differential ion mobility spectrometry that is switchable to remove high mobility ions, in accordance with various embodiments.

FIG. 11 is a flowchart 1100 showing a method for differential ion mobility spectrometry that is switchable to remove high mobility ions, in accordance with various embodiments.

In step 1110 of the method of FIG. 11, a second electrode is placed in parallel with a first electrode to provide constant gap distance, d, between the first electrode and the second electrode.

In step 1120, for differential ion mobility spectrometry, a first symmetric waveform is applied to the first electrode and a second symmetric waveform is applied to the second electrode. The frequency of the second waveform is a harmonic of the frequency of the first waveform. A ratio of the amplitude of the first waveform to the amplitude of the second waveform and a relative phase difference between the first waveform and the second waveform are configured to provide an appropriate electric field between the first electrode and the second electrode which is asymmetric and a has a time-averaged value substantially equal to zero.

In step 1130, for high-field symmetric-waveform filtering of high mobility ions, the second symmetric waveform is removed from the second electrode. The first waveform produces a symmetric electric field waveform in the gap between the first electrode and the second electrode with a maximum electric field strength, E. The electric field waveform displaces an ion radially from the center of the gap during one half of the electric field waveform a distance $y=K(E) \times E \times t$, where $K(E)$ is the mobility coefficient and t is the half period of the electric field waveform. The constant gap distance and the amplitude and frequency of the first waveform are configured to filter high mobility ions by producing the electric field waveform with an E and t that causes ions in the gap with a $K(E) \geq (d/(2 \times E \times t))$ to impact the first electrode or the second electrode and be removed, and causes ions in the gap with a $K(E) < (d/(2 \times E \times t))$ to pass through the gap. The first waveform is configured to produce the electric field waveform with a maximum density normalized electric field strength, E/N, greater than 10 Td, for example.

In various embodiments, for high-field symmetric-waveform filtering of high mobility ions, a third symmetric waveform is applied to the second electrode. The first waveform and the third waveform produce a symmetric electric field waveform in the gap between the first electrode and the second electrode with a maximum electric field strength, E. The amplitude and frequency of the first waveform and the amplitude and frequency of the third waveform are configured to filter high mobility ions by producing the electric field waveform with an E and t that causes ions in the gap with a $K(E) \geq (d/(2 \times E \times t))$ to impact the first electrode or the second electrode and be removed, and causes ions in the gap with a $K(E) < (d/(2 \times E \times t))$ to pass through the gap. In various embodiments, the constant gap height, the amplitude of the first waveform, and the amplitude of the third waveform are configured to produce the symmetric electric field with the density normalized electric field strength, E/N, greater than 10 Td. This configuration with three harmonics provides additional flexibility to optimize the symmetric waveform shape and amplitude for various specific applications.

FAIMS Device Switchable for Fragmenting Ions

Returning to FIG. 10, high-field asymmetric-waveform apparatus for differential ion mobility spectrometry of FIG. 10 can also be switchable to a high-field symmetric-waveform apparatus for fragmenting ions, in accordance with various embodiments. For fragmentation, switching circuit 1050 also electrically connects first waveform generator 1015 to first electrode 1010 and electrically disconnects second waveform generator 1025 from second electrode 1020. The first waveform, however, produces a symmetric electric field waveform in the gap between first electrode 1010 and second electrode 1020 with a higher maximum electric field strength, E. Specifically, the amplitude of the first waveform is configured to fragment ions in the gap by producing the electric field waveform with E/N greater than 100 Td. In addition, the constant gap distance and the amplitude and frequency of the first waveform are configured to transmit all ions in the gap by producing the electric field waveform with an E and t so that the distance y for each ion in the gap is less than d/2, so each ion in the gap is transmitted through the gap.

In some embodiments, the first waveform is configured to fragment ions, clusters, or other large species, and the amplitude and frequency of the first waveform as well as the gap height are configured to simultaneously filter out high mobility fragments by colliding them with the filter electrodes.

As described above, the distance y is the distance in which ion 1030 is displaced radially from the center of the gap in direction 1032 during one half of the electric field waveform and is given by $y=K(E) \times E \times t$, where $K(E)$ is the mobility coefficient and t is the half period of the electric field waveform.

In various embodiments, the high-field asymmetric-waveform apparatus of FIG. 10 can also be modified to fragment ions using two waveform generators. For high-field symmetric-waveform ion fragmentation, switching circuit 1050 electrically connects first waveform generator 1015 to first electrode 1010 and electrically connects second waveform generator 1025 to second electrode 1020. Phase adjusting circuit 1040 adjusts the phase of first waveform generator 1015 or second waveform generator 1025 to produce a combined symmetric waveform. In other words, to go from an asymmetric to symmetric waveform phase adjusting circuit 1040 adjusts the phase of first waveform generator 1015 or second waveform generator 1025. The first waveform and the second waveform produce a symmetric electric field waveform in the gap between the first electrode and the second electrode with a greater maximum electric field strength, E. Specifically, the constant gap distance, the amplitude of the first waveform, and the amplitude of the second waveform are configured to fragment ions in the gap by producing the electric field waveform with E/N greater than 100 Td. In addition, the amplitude and frequency of the first waveform and the amplitude and frequency of the second waveform are configured to transmit all ions in the gap by producing the electric field waveform with an E and t so that the distance y for each ion in the gap is less than d/2, so each ion in the gap is transmitted through the gap.

Method for DMS that is Switchable to Ion Fragmentation

Figure 12:
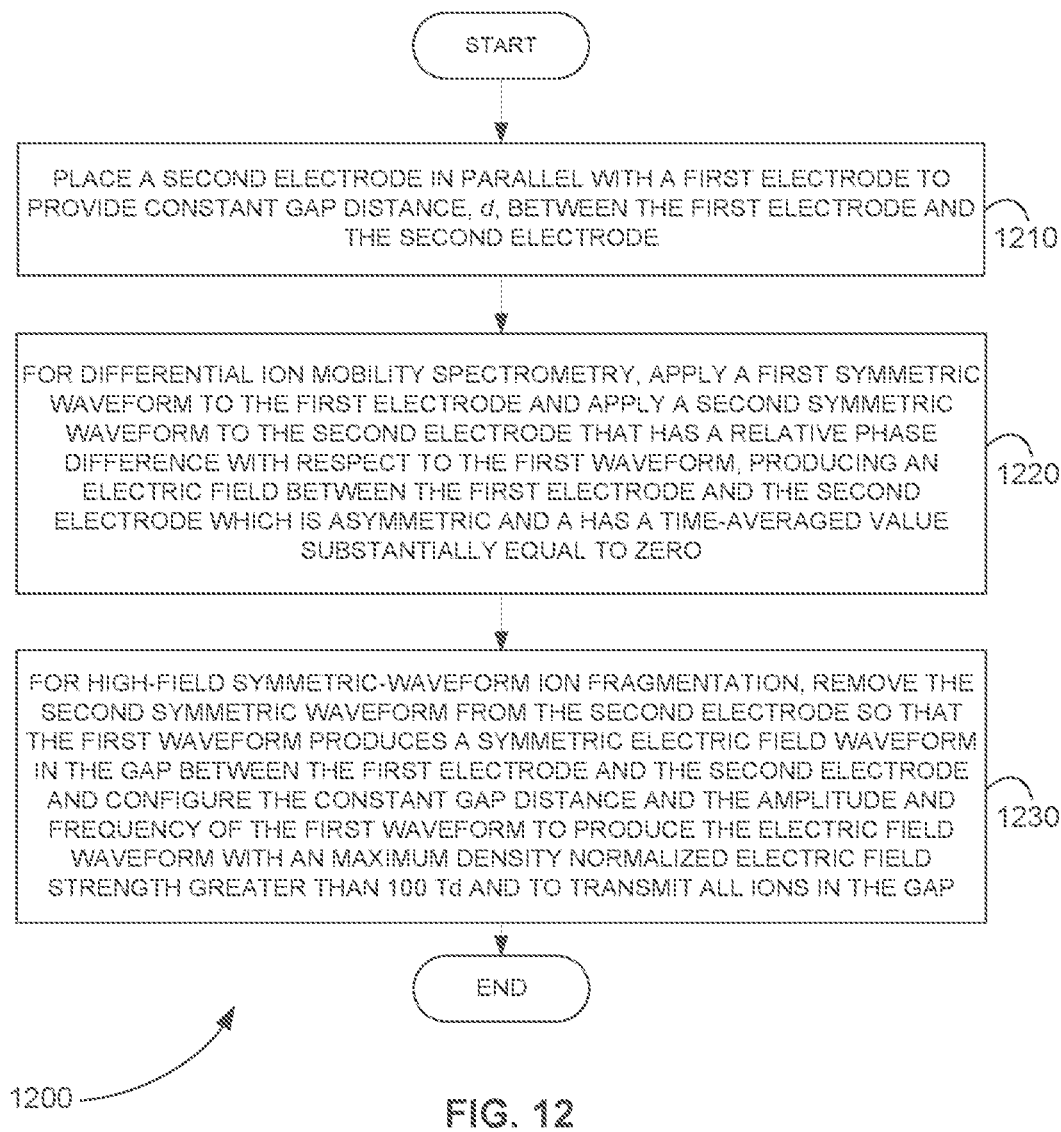
FIG. 12 is a flowchart showing a method for differential ion mobility spectrometry that is switchable to fragment ions, in accordance with various embodiments.

FIG. 12 is a flowchart 1200 showing a method for differential ion mobility spectrometry that is switchable to fragmenting ions, in accordance with various embodiments.

In step 1210 of the method of FIG. 12, a second electrode is placed in parallel with a first electrode to provide constant gap distance, d, between the first electrode and the second electrode.

In step 1220, for differential ion mobility spectrometry, a first sinusoidal is applied to the first electrode and a second symmetric waveform is applied to the second electrode. The frequency of the second waveform is a harmonic of the frequency of the first waveform. A ratio of the amplitude of the first waveform to the amplitude of the second waveform and a relative phase difference between the first waveform and the second waveform are configured to provide an electric field between the first electrode and the second electrode which is asymmetric and has a time-averaged value substantially equal to zero.

In step 1230, for high-field symmetric-waveform ion fragmentation, the second symmetric waveform is removed from the second electrode. The first waveform produces a symmetric electric field waveform in the gap between the first electrode and the second electrode with a maximum electric field strength, E. The electric field waveform displaces an ion radially from the center of the gap during one half of the electric field waveform a distance $y=K(E) \times E \times t$, where $K(E)$ is the mobility coefficient and t is the half period of the electric field waveform. The constant gap distance and the amplitude and frequency of the first waveform are configured to fragment ions in the gap by producing the electric field waveform with E/N greater than 100 Td and to transmit all ions in the gap by producing the electric field waveform with an E and t so that the distance y for each ion in the gap is less than d/2, so each ion in the gap is transmitted through the gap; this would not be necessary if it were desirable to combine fragmentation and effective gap filtering.

In various embodiments, for high-field symmetric-waveform ion fragmentation, a third symmetric waveform is applied to the second electrode. The first waveform and the third waveform produce a symmetric electric field waveform in the gap between the first electrode and the second electrode with a maximum electric field strength, E. The amplitude and frequency of the first waveform and the amplitude and frequency of the third waveform are configured to fragment ions in the gap by producing the electric field waveform with E greater than 100 Td and to transmit all ions in the gap by producing the electric field waveform with an E and t so that the distance y for each ion in the gap is less than d/2, so each ion in the gap is transmitted through the gap.

Experimental Data for Ion Filtering

The apparatus of FIG. 10 was used to filter high mobility ions. The gap height, d, was 265 μm. First waveform generator 1015 applied a 3 MHz first symmetric waveform to first electrode 1010, and second waveform generator 1025 applied a 6 MHz second symmetric waveform to second electrode 1020.

FIG. 13A is a plot 1300 showing exemplary waveforms applied to the electrodes of FIG. 10 and a resulting asymmetric waveform, in accordance with various embodiments. First symmetric waveform 1310 has a frequency of 3 MHz and is applied to first electrode 1010 of FIG. 10. Second symmetric waveform 1320 of FIG. 13 has a frequency of 6 MHz and is applied to second electrode 1020 of FIG. 10. While this configuration was used to produce the data below, other electrical configurations are also possible.

Figure 13B:
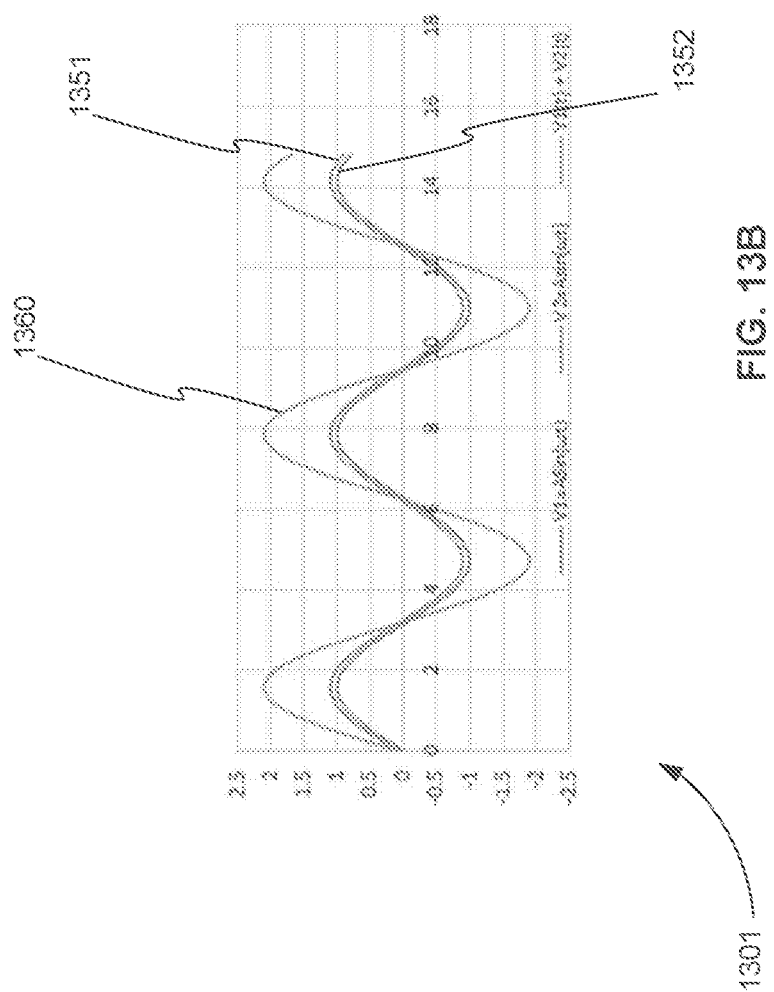
FIG. 13B is a plot of showing additional exemplary waveforms applied to the electrodes of FIG. 10 and a resulting symmetric waveform in accordance with an embodiment for generation of enhanced sinusoidal electric fields in the analytical gap by applying simultaneously two identical waveforms on upper and lower electrodes, to enhance the intensity of the field by two times.

For instance, FIG. 13B shows a configuration where 2 sinusoidal waveforms (1351 and 1352) of equal amplitude and frequency are applied to the first and second electrode. The relative phase is adjusted to create an additional sinusoidal waveform 1360 with double the amplitude in the gap. Many other waveforms may also be used including single harmonics of various shape, 2-harmonic configurations, 3-harmonic configurations, etc.

Returning to FIG. 13A, for differential ion mobility spectrometry, the ratio of the amplitude of first waveform 1310 to the amplitude of second waveform 1320 and a relative phase difference between first waveform 1310 and second waveform 1320 are configured to provide an electric field between first electrode 1010 of FIG. 10 and second electrode 1020, which is asymmetric and has a time-averaged value substantially equal to zero. Waveform 1330 of FIG. 13 is the asymmetric electric field produced by first waveform 1310 and second waveform 1320 for differential ion mobility spectrometry.

For high-field symmetric-waveform filtering of high mobility ions, switching circuit 1050 of FIG. 10 was used to apply only one waveform to electrodes 1010 and 1020. A bovine serum albumin (BSA) digest was ionized using an ESI source. The DMS cell was sealed to the inlet orifice of a mass spectrometer as described previously (U.S. Pat. No. 8,084,736) incorporated herein by reference, and the electrode DC potentials were floated relative to the mass spectrometer inlet orifice to reach highest intensity mass spectra. The gas flow through the DMS was controlled using the throttle/bleed gas port. When a roughing pump was attached to the bleed gas port, it was possible to withdraw sufficient gas from the DMS cell to reduce the pressure below atmospheric. Operating with subatmospheric pressure was beneficial for fragmenting ions as it made it possible to achieve increased E/N while operating with a fixed symmetric waveform amplitude.

The BSA digest ions were transmitted into the gap between electrodes 1010 and 1020. Initially, no waveform was applied to electrodes 1010 and 1020. A mass spectrum of the BSA digest sample was obtained using a mass analyzer.

Figure 14:
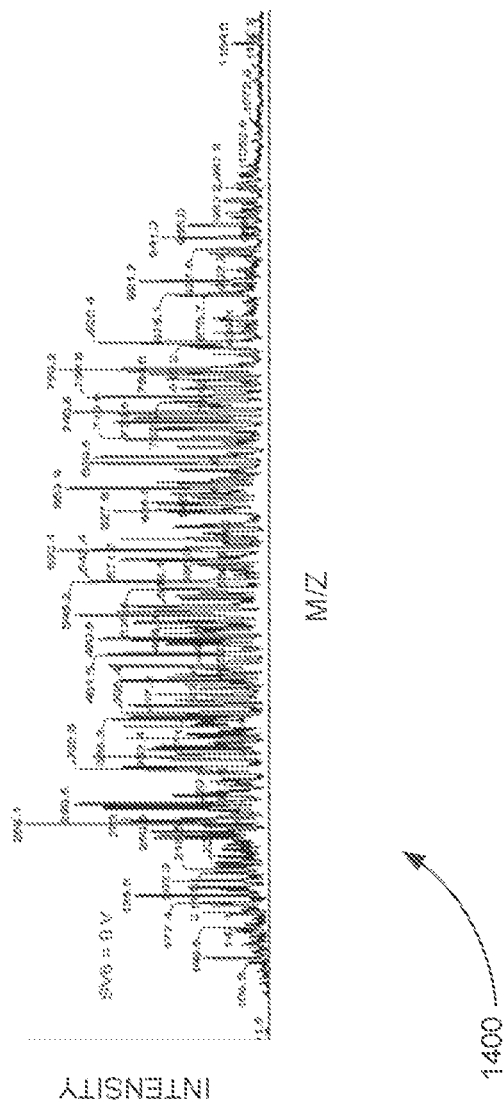
FIG. 14 is a mass spectrum plot of bovine serum albumin (BSA) digest ions in the gap of the apparatus of FIG. 10 when no waveforms are applied to either electrode, in accordance with various embodiments.

FIG. 14 is a Q1 scan plot 1400 for a bovine serum albumin (BSA) digest sample drawn through the gap of the apparatus of FIG. 10 when no waveforms were applied to either electrode, in accordance with various embodiments. Plot 1400 shows the BSA digest peptide ion peaks and numerous peaks corresponding to chemical noise.

Using switching circuit 1050 of FIG. 10, second waveform generator 1025 was then configured to apply a 6 MHz second symmetric waveform with 2,400 V peak-to-peak to second electrode 1020. Using switching circuit 1050, no waveform was applied to first electrode 1010. Second symmetric waveform produced a symmetric electric field waveform in the gap between first electrode 1010 and second electrode 1020 that was applied to the BSA digest ions.

Figure 15:
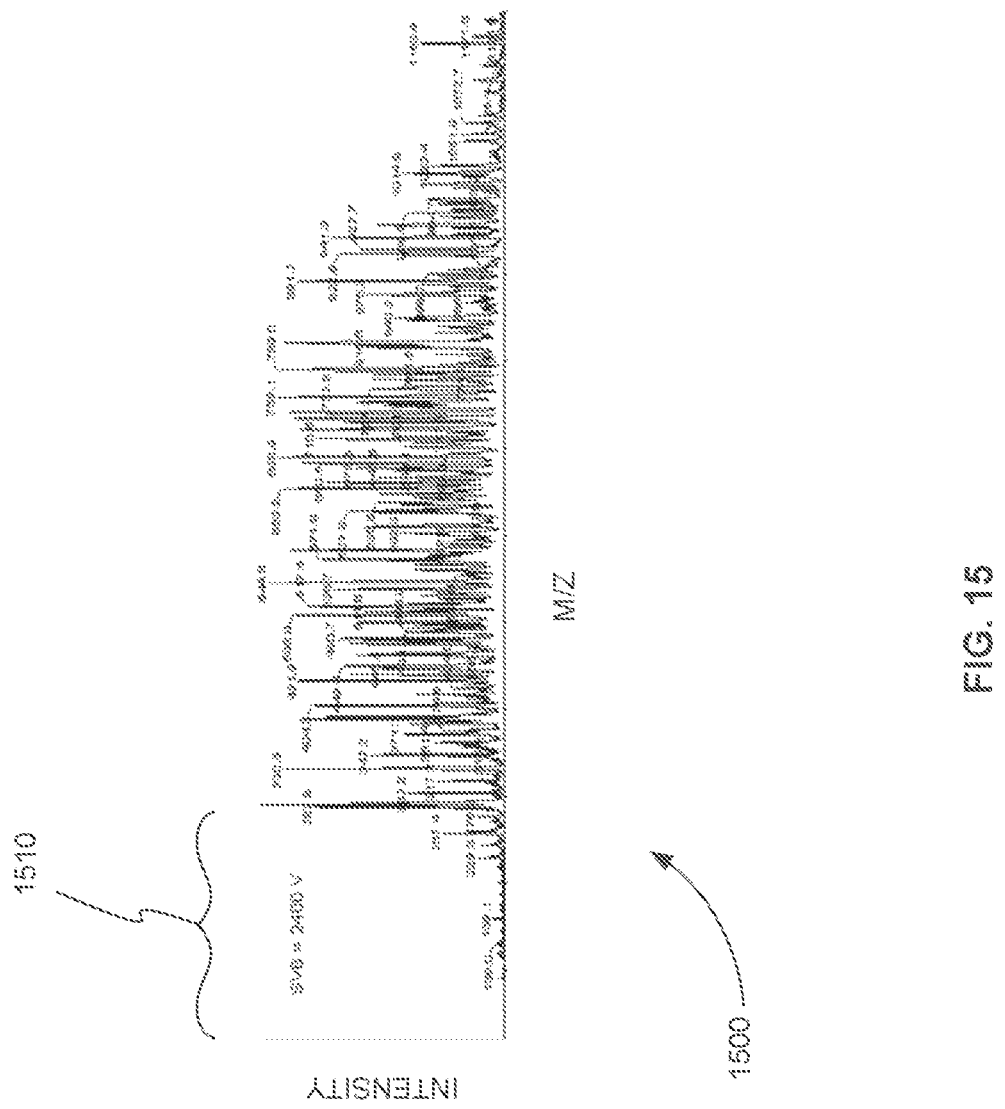
FIG. 15 is a mass spectrum plot of BSA digest ions in the gap of the apparatus of FIG. 10 when a 6 MHz, 2,400 V peak-to-peak sinusoidal waveform is applied to one electrode, in accordance with various embodiments.

FIG. 15 is a Q1 scan plot 1500 of BSA digest ions in the gap of the apparatus of FIG. 10 when a 6 MHz, 2,400 V peak-to-peak sinusoidal waveform was applied to one electrode, in accordance with various embodiments. Plot 1500 shows that the symmetric electric field waveform produced by the single harmonic waveform (6 MHz) applied to one electrode was able to filter high mobility ions (with low m/z) in region 1510. Region 1510 includes m/z values between 0 and 300. Even more dramatic signal reduction was found using the same amplitude but lower frequency (3 MHz) waveform.

Figure 16:
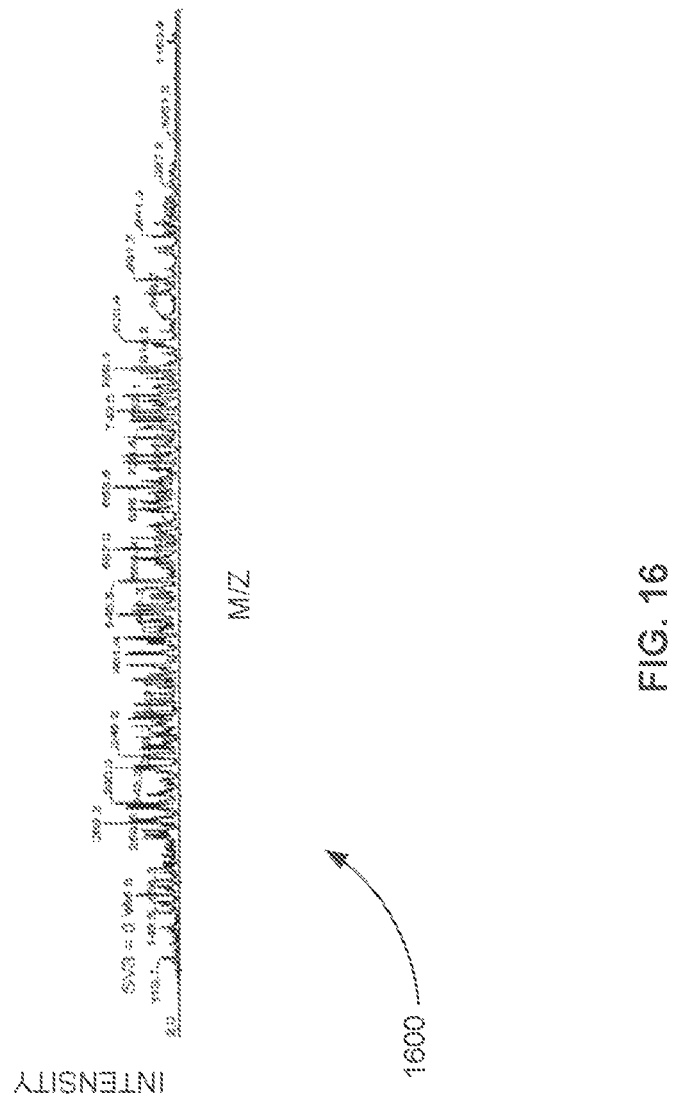
FIG. 16 is a mass spectrum plot of BSA digest ions in the gap of the apparatus of FIG. 10 when no waveforms are applied to either electrode like FIG. 14, but with a different intensity scale, in accordance with various embodiments.

FIG. 16 is a Q1 scan plot 1600 of BSA digest ions in the gap of the apparatus of FIG. 10 when no waveforms were applied to either electrode like FIG. 14, but with a different intensity scale, in accordance with various embodiments. Again, plot 1600 shows the BSA digest ions and chemical noise before any ion filtering.

Using switching circuit 1050 of FIG. 10, first waveform generator 1015 was then configured to apply a 3 MHz first symmetric waveform to first electrode 1010. Using switching circuit 1050, no waveform was applied to second electrode 1020. First symmetric waveform produced a symmetric electric field waveform in the gap between first electrode 1010 and second electrode 1020 that was applied to the BSA digest ions. Three Q1 scan spectra were obtained for three different amplitudes of harmonic voltage applied to a first electrode: 1,500, 2,000, and 2,500 V peak-to-peak.

Figure 17:
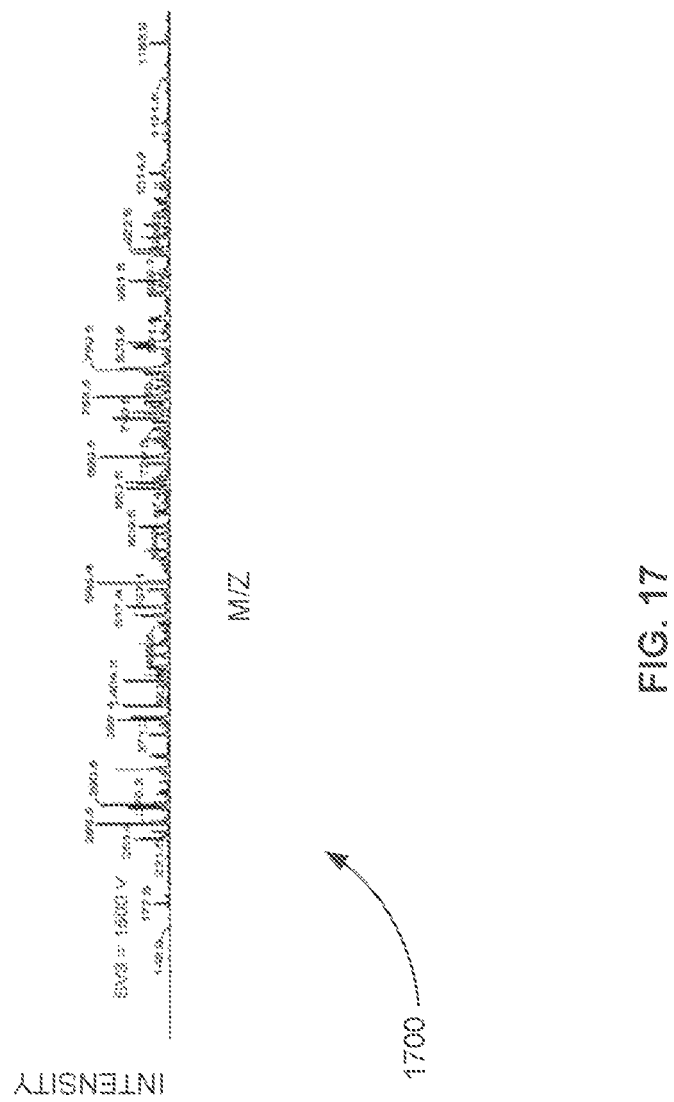
FIG. 17 is a mass spectrum plot of BSA digest ions in the gap of the apparatus of FIG. 10 when a 3 MHz, 1,500 V peak-to-peak sinusoidal waveform is applied to one electrode, in accordance with various embodiments.

FIG. 17 is a Q1 scan plot 1700 of BSA digest ions in the gap of the apparatus of FIG. 10 when a 3 MHz, 1,500 V peak-to-peak sinusoidal waveform was applied to one electrode, in accordance with various embodiments.

Figure 18:
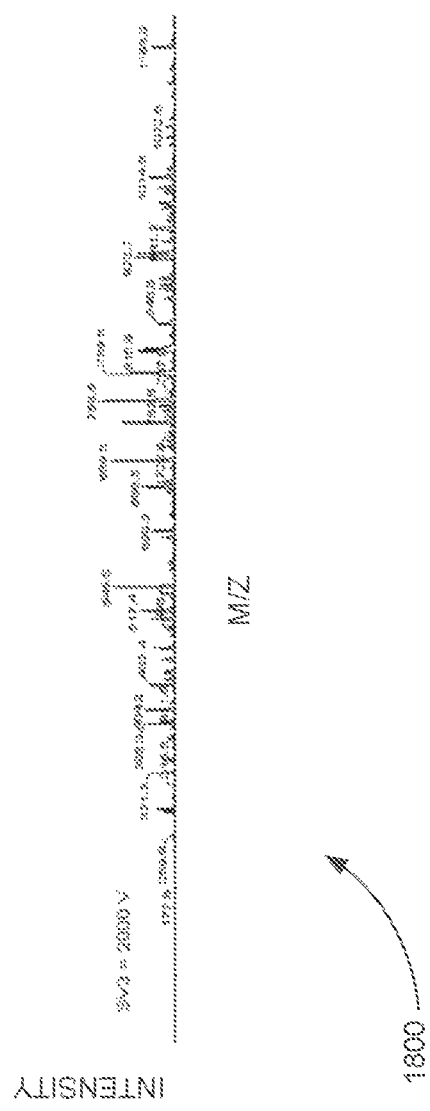
FIG. 18 is a mass spectrum plot of BSA digest ions in the gap of the apparatus of FIG. 10 when a 3 MHz, 2,000 V peak-to-peak sinusoidal waveform is applied to one electrode, in accordance with various embodiments.

FIG. 18 is a Q1 scan plot 1800 of BSA digest ions in the gap of the apparatus of FIG. 10 when a 3 MHz, 2,000 V peak-to-peak sinusoidal waveform was applied to one electrode, in accordance with various embodiments.

Figure 19:
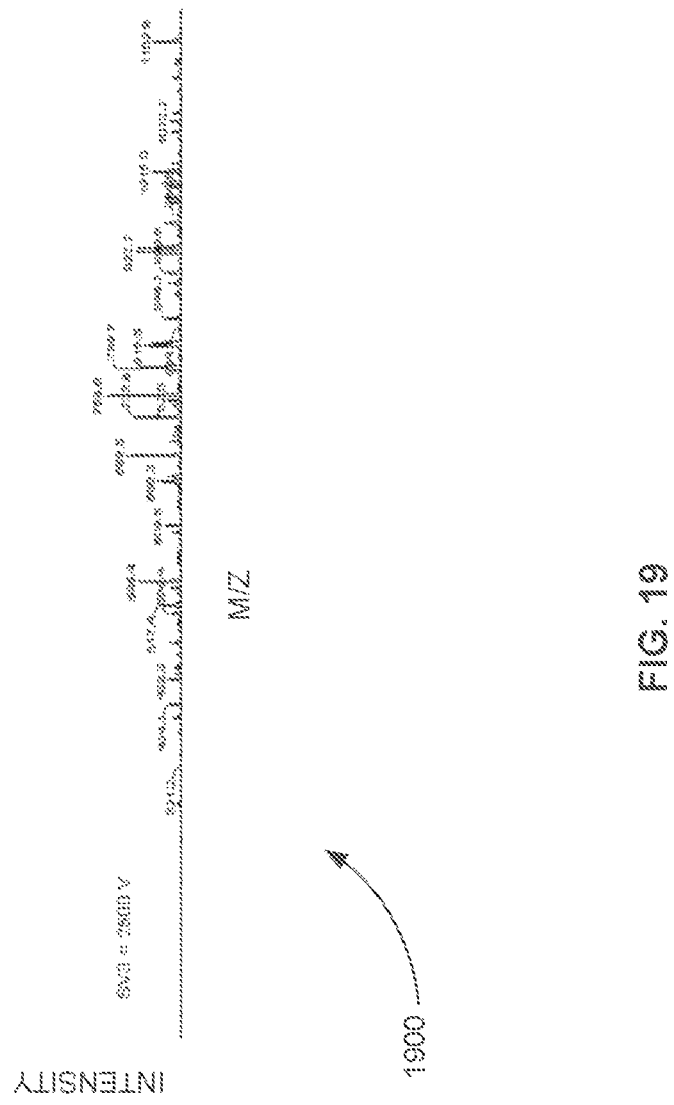
FIG. 19 is a mass spectrum plot of BSA digest ions in the gap of the apparatus of FIG. 10 when a 3 MHz, 2,500 V peak-to-peak sinusoidal waveform is applied to one electrode, in accordance with various embodiments.

FIG. 19 is a Q1 scan plot 1900 of BSA digest ions in the gap of the apparatus of FIG. 10 when a 3 MHz, 2,500 V peak-to-peak sinusoidal waveform was applied to one electrode, in accordance with various embodiments.

FIGS. 17-19 in comparison with FIG. 15 show that using a lower frequency 3 Mhz produced a more dramatic signal reduction. As the amplitude of the 3 MHz (instead of 6 MHz) waveform increased, the range of filtered high mobility ions expanded towards larger m/z.

In this series of experiments peptide peaks in the DMS spectra maintained the same intensity with changing the amplitude of the filtering sinusoidal electric field. At the same time, chemical noise in the spectra obtained with RF filtration, especially with maximum AC voltage (2,500 V), was reduced. This provides strong evidence about the efficiency of removing light ion species which can be the product of declustering solvent clusters, ion complexes, and fragmentation of heavy ions including invisible asteroids. By adjusting the intensity of the harmonic potential, it is possible to adjust the generated spectrum to optimize for a particular application.

A comparison among FIGS. 17-19 shows that increasing the amplitude of the sinusoidal waveform also reduced the signal for some ions of higher m/z including undesirable solvent clusters. This is due to declustering or fragmentation, for example, and requires operation in the high field regime.

Direct Observation of Ion Fragmentation Under the Effect of Strong AC Fields

The apparatus of FIG. 10 was similarly used to fragment ions in the analytical gap. Again, the gap height, d, was 265 µm. For high-field symmetric-waveform ion fragmentation, switching circuit 1050 of FIG. 10 was used to apply only one sinusoidal waveform with a frequency of 6 MHz to one of the electrodes 1010 and 1020.

A sample comprising valine ions was introduced into the apparatus. A valine precursor ion (MH$^+$) has an m/z of 118 and the valine product ion has an m/z of 72. Ions transmitted by the apparatus were monitored for the valine precursor ion and the valine product ion using a mass spectrometer.

Initially, the sinusoidal waveform with a frequency of 6 MHz was applied with 1500 V peak-to-peak amplitude applied to one electrode to fragment the valine precursor ions into valine product ions. At time 0.35 min, the sinusoidal waveform was removed to simply transmit the valine precursor ions. The application and removal of the sinusoidal waveform were repeated a number of times as shown in FIGS. 20 and 21.

Figure 20:
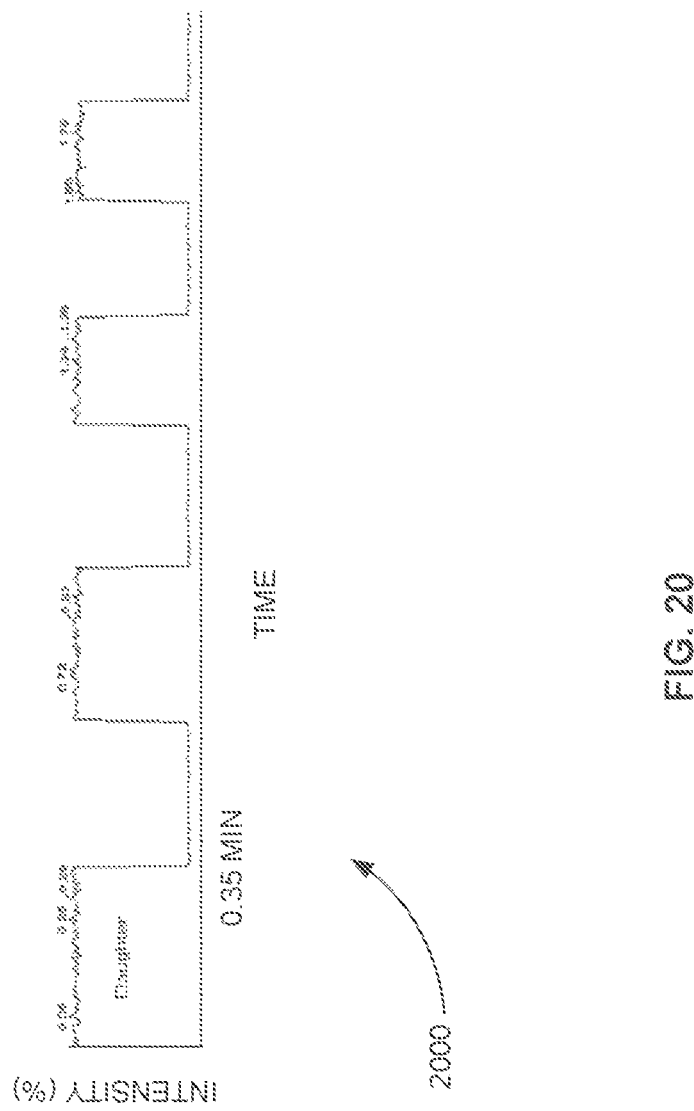
FIG. 20 is an extracted ion chromatogram (XIC) plot for the valine product ion for an experiment in which a sinusoidal waveform with a frequency of 6 MHz and an amplitude of 1,500 V peak-to-peak is periodically applied to one electrode of the apparatus of FIG. 10 to fragment valine precursor ions, in accordance with various embodiments.

FIG. 20 is an extracted ion chromatogram (XIC) plot 2000 for the valine product ion for an experiment in which a sinusoidal waveform with a frequency of 6 MHz and an amplitude of 1,500 V peak-to-peak was periodically applied to one electrode of the apparatus of FIG. 10 to fragment valine precursor ions, in accordance with various embodiments. Plot 2000 shows that valine product ions were produced during the times that the sinusoidal waveform was applied. The production of valine product ions verifies that the sinusoidal waveform can be used to fragment ions.

Figure 21:
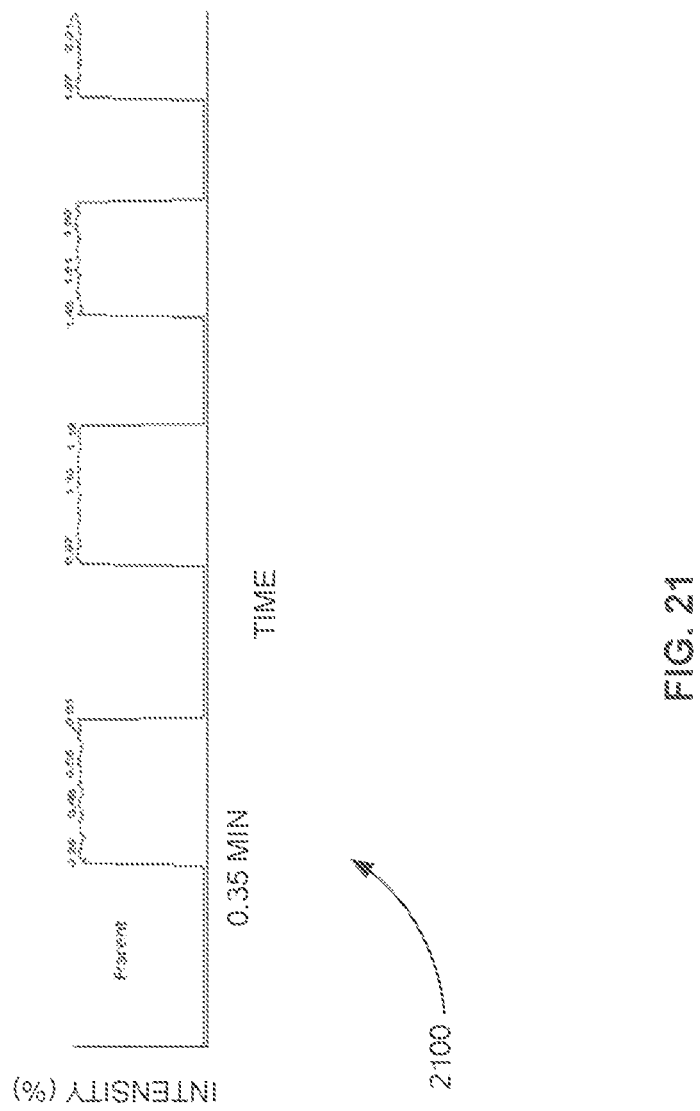
FIG. 21 is an XIC plot for the valine precursor ion for an experiment in which a sinusoidal waveform with a frequency of 6 MHz and an amplitude of 1,500 V peak-to-peak is periodically applied to one electrode of the apparatus of FIG. 10 to fragment valine precursor ions, in accordance with various embodiments.

FIG. 21 is an XIC plot 2100 for the valine precursor ion for an experiment in which a sinusoidal waveform with a frequency of 6 MHz and an amplitude of 1,500 V peak-to-peak was periodically applied to one electrode of the apparatus of FIG. 10 to fragment valine precursor ions, in accordance with various embodiments. Plot 2100 shows that valine precursor ions were transmitted during the times that the sinusoidal waveform was not applied, and the precursor ion signal was depleted due to fragmentation when the sinusoidal waveform was applied.

Finally, an experiment was conducted to determine if the ion current encapsulated in asteroids could be reduced. As described above, asteroids are large ion cluster complexes with m/z values outside the typical mass range of a mass spectrometer. In the current case these are ions with m/z>1000.

Figure 22:
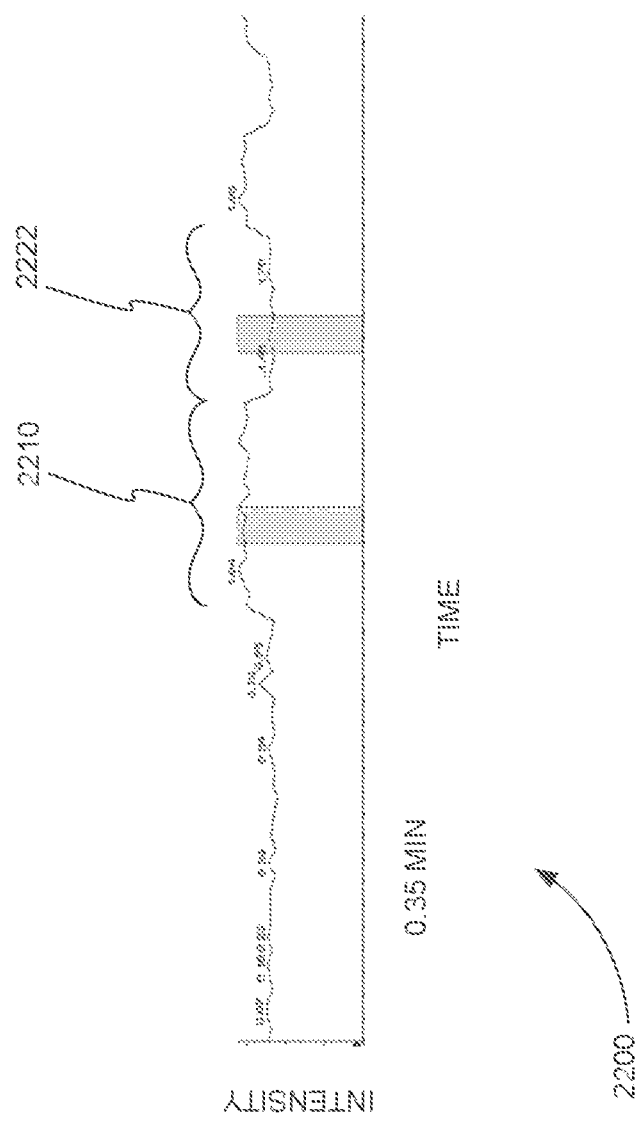
FIG. 22 is a total ion chromatogram (TIC) plot for an asteroid product ion scan with Q1 set to open resolution and fixed at m/z 1250, in which a sinusoidal waveform with a frequency of 6 MHz and an amplitude of 2,300 V peak-to-peak is periodically applied to one electrode of the apparatus of FIG. 10, in accordance with various embodiments.

FIG. 22 is a total ion chromatogram (TIC) plot 2200 for an asteroid product ion scan of m/z≥1000 for an experiment in which a sinusoidal waveform with a frequency of 6 MHz and an amplitude of 2,300 V peak-to-peak was periodically applied to one electrode of the apparatus of FIG. 10, in accordance with various embodiments. The sinusoidal waveform was not applied during time period 2210 and was applied during time period 2222. The TIC for the asteroid scan decreased by about 27% when the sinusoidal waveform was applied for RF heating. These results are encouraging because they suggest that radial RF heating may limit the asteroid population, potentially improving long term robustness.

While the present teachings are described in conjunction with various embodiments, it is not intended that the present teachings be limited to such embodiments. On the contrary, the present teachings encompass various alternatives, modifications, and equivalents, as will be appreciated by those of skill in the art. For example, this methodology is suitable for controlling the presence of heavy invisible asteroids ion complexes. To fragment very large clusters, significantly higher electric fields may be required however, heavy ions would have smaller oscillation amplitude, and therefore require even higher AC fields for heating.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A high-field symmetric-waveform apparatus for filtering high mobility ions, comprising:
    a first electrode;
    a second electrode placed in parallel with the first electrode to provide constant gap distance, d, between the first electrode and the second electrode;
    a first high-voltage waveform generator electrically connected to the first electrode and configured to produce a first symmetric waveform,
        wherein the first symmetric waveform produces a symmetric electric field waveform in the gap between the first electrode and the second electrode with a maximum density normalized electric field energy, E/N (the electric field strength, E, divided by the gas number density, N), greater than 10 Td and the electric field waveform displaces an ion radially from the center of the gap during one half of the electric field waveform a distance $y=K(E) \times E \times t$, where $K(E)$ is the mobility coefficient and t is the half period of the electric field waveform,
        wherein the symmetric electric field waveform is produced with the maximum E/N greater than 10 Td to make $K(E)$ of ions in the gap a function of E/N, and
        wherein the constant gap distance and the amplitude and frequency of the first symmetric waveform are configured to filter high mobility ions.

2. The apparatus of claim 1, further comprising a pumping device to increase or decrease a pressure in the gap, wherein the pressure, the constant gap distance, and the amplitude and frequency of the first symmetric waveform are configured to filter high mobility ions.

3. The apparatus of claim 1, further comprising
a second high-voltage waveform generator electrically connected to the second electrode and configured to produce a second symmetric waveform,
wherein the first symmetric waveform and the second symmetric waveform produce the symmetric electric field waveform in the gap between the first electrode and the second electrode with a maximum density normalized electric field energy, E/N, greater than 10 Td and the electric field waveform displaces an ion radially from the center of the gap during one half of the electric field waveform a distance y=K(E)×E×t, where K(E) is the mobility coefficient and t is the half period of the electric field waveform,
wherein the symmetric electric field waveform is produced with the maximum E/N greater than 10 Td to make K(E) of ions in the gap a function of E/N, and
wherein the constant gap distance, the amplitude and frequency of the first symmetric waveform, and the amplitude and frequency of the second symmetric waveform are configured to filter high mobility ions.

4. The apparatus of claim 3, further comprising a pumping device to increase or decrease a pressure in the gap, wherein the pressure, the constant gap distance, the amplitude and frequency of the first symmetric waveform, and the amplitude and frequency of the second symmetric waveform are configured to filter high mobility ions.

5. A method for filtering high mobility ions, comprising:
placing a second electrode in parallel with a first electrode to provide constant gap distance, d, between the first electrode and the second electrode;
applying a first symmetric waveform to the first electrode;
wherein the first symmetric waveform produces a symmetric electric field waveform in the gap between the first electrode and the second electrode with a maximum density normalized electric field energy, E/N (the electric field strength, E, divided by the gas number density, N), greater than 10 Td and the electric field waveform displaces an ion radially from the center of the gap during one half of the electric field waveform a distance y=K(E)×E×t, where K(E) is the mobility coefficient and t is the half period of the electric field waveform,
wherein the symmetric electric field waveform is produced with the maximum E/N greater than 10 Td to make K(E) of ions in the gap a function of E/N, and
wherein the constant gap distance and the amplitude and frequency of the first symmetric waveform are configured to filter high mobility ions.

6. The method of claim 5, further comprising increasing or decreasing a pressure in the gap, wherein the pressure, the constant gap distance, and the amplitude and frequency of the first symmetric waveform are configured to filter high mobility ions.

7. The method of claim 5, further comprising
applying a second symmetric waveform to the second electrode,
wherein the first symmetric waveform and the second symmetric waveform produce the symmetric electric field waveform in the gap between the first electrode and the second electrode with a maximum density normalized electric field energy, E/N, greater than 10 Td and the electric field waveform displaces an ion radially from the center of the gap during one half of the electric field waveform a distance y=K(E)×E×t,
where K(E) is the mobility coefficient and t is the half period of the electric field waveform,
wherein the symmetric electric field waveform is produced with the maximum E/N greater than 10 Td to make K(E) of ions in the gap a function of E/N, and
wherein the constant gap distance, the amplitude and frequency of the first symmetric waveform, and the amplitude and frequency of the second symmetric waveform are configured to filter high mobility ions.

8. The method of claim 7, further comprising increasing or decreasing a pressure in the gap, wherein the pressure, the constant gap distance, the amplitude and frequency of the first symmetric waveform, and the amplitude and frequency of the second symmetric waveform are configured to filter high mobility ions.

9. A high-field symmetric-waveform apparatus for filtering and fragmenting ions, comprising:
a first electrode;
a second electrode placed in parallel with the first electrode to provide constant gap distance, d, between the first electrode and the second electrode;
a first high-voltage waveform generator electrically connected to the first electrode and configured to produce a first symmetric waveform,
wherein the first symmetric waveform produces a symmetric electric field waveform in the gap between the first electrode and the second electrode with a maximum density normalized electric field energy, E/N, greater than 10 Td and the electric field waveform displaces an ion radially from the center of the gap during one half of the electric field waveform a distance y=K(E)×E×t, where K(E) is the mobility coefficient and t is the half period of the electric field waveform,
wherein the symmetric electric field waveform is produced with the maximum E/N greater than 10 Td to make K(E) of ions in the gap a function of E/N, and
wherein the constant gap distance and the amplitude and frequency of the first symmetric waveform are configured to filter high mobility ions in the gap by producing the electric field waveform with the maximum E/N greater than 10 Td and to fragment ions in the gap by producing the electric field waveform with the maximum E/N greater than 100 Td.

10. The apparatus of claim 9, further comprising a pumping device to increase or decrease a pressure in the gap, wherein the pressure, the constant gap distance and the amplitude and frequency of the first symmetric waveform are configured to fragment ions in the gap by producing the density normalized electric field waveform with the maximum E/N greater than 100 Td.

11. The apparatus of claim 9, further comprising
a second high-voltage waveform generator electrically connected to the second electrode and configured to produce a second symmetric waveform,
wherein the first symmetric waveform and the second symmetric waveform produce the symmetric electric field waveform in the gap between the first electrode and the second electrode with a maximum density normalized electric field energy, E/N, greater than 100 Td and the electric field waveform displaces an ion radially from the center of the gap during one half of the electric field waveform a distance y=K(E)×E×t, where K(E) is the mobility coefficient and t is the half period of the electric field waveform,
wherein the symmetric electric field waveform is produced with a maximum E/N greater than 100 Td to make K(E) of ions in the gap a function of E/N, and wherein the constant gap distance, the amplitude and frequency of the first symmetric waveform, and the amplitude and frequency of the second symmetric waveform are configured to fragment ions in the gap by producing the electric field waveform with the maximum E/N greater than 100 Td.

12. The apparatus of claim 11, further comprising a pumping device to increase or decrease a pressure in the gap, wherein the pressure, the constant gap distance, the amplitude and frequency of the first symmetric waveform, and the amplitude and frequency of the second symmetric waveform are configured to fragment ions in the gap by producing the electric field waveform with the maximum E/N greater than 100 Td.

13. The apparatus of claim 1 wherein the first electrode and the second electrode are selected from the group consisting of parallel strip electrodes, parallel plate electrodes, concentric cylinders, spherical shaped elements and curved shape elements.

14. The method of claim 5 wherein the first electrode and the second electrode are selected from the group consisting of parallel strip electrodes, parallel plate electrodes, concentric cylinders, spherical shaped elements and curved shape elements.

15. The apparatus of claim 9 wherein the first electrode and the second electrode are selected from the group consisting of parallel strip electrodes, parallel plate electrodes, concentric cylinders, spherical shaped elements and curved shape elements.

* * * * *